US012754308B2

(12) United States Patent
Palakonda et al.

(10) Patent No.: US 12,754,308 B2
(45) Date of Patent: Oct. 6, 2026

(54) UWB MOVING OBJECT DETECTION AND ALERTING

(71) Applicant: Ford Global Technologies, LLC, Dearborn, MI (US)

(72) Inventors: Sathyanarayana Chary Palakonda, Northville, MI (US); Ivan Vukovic, Birmingham, MI (US); Jean de Dieu Mutangana, Detroit, MI (US); Sanketh Venkatesh Prasad, Bloomington, IL (US); Bryan Michael Bolger, Canton, MI (US); Jeffrey Wallat, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 18/819,392

(22) Filed: Aug. 29, 2024

(65) Prior Publication Data

US 2026/0063790 A1 Mar. 5, 2026

(51) Int. Cl.
*G01S 13/86* (2006.01)
*G01S 5/14* (2006.01)
(Continued)

(52) U.S. Cl.
CPC ................ *G01S 13/86* (2013.01); *G01S 5/14* (2013.01); *G01S 13/0209* (2013.01); *G01S 13/56* (2013.01)

(58) Field of Classification Search
CPC .... G01S 13/0209; G01S 13/56; G01S 13/765; G01S 13/86; G01S 13/931;
(Continued)

(56) References Cited

U.S. PATENT DOCUMENTS 9,689,982 B2 6/2017 Herthan
10,172,145 B2 * 1/2019 Hazebrouck ............ H04W 4/40
(Continued)

FOREIGN PATENT DOCUMENTS

EP 4112370 A1 1/2023

OTHER PUBLICATIONS

Ekman et al., "An Intelligent Traffic System for Vulnerable Road Users", Department of Traffic Planning and Engineering, Lund Institute of Technology, May 1992, 65 pages.

*Primary Examiner* — Peter M Bythrow
(74) *Attorney, Agent, or Firm* — Joseph Zane; Brooks Kushman P.C.

(57) ABSTRACT

Ultra-wideband (UWB) radar and ranging sessions is performed. Responsive to one or more mobile devices being detected within the vehicle, an inside schedule mode is activated with an inside scheduling of UWB radar sessions and UWB ranging sessions for UWB anchors of the vehicle. Responsive to the vehicle entering a key-off state, and no mobile devices being detected within the vehicle, an outside schedule mode is activated with an outside scheduling of UWB radar sessions and UWB ranging sessions for the UWB anchors of the vehicle. In the inside schedule mode, the UWB anchors perform localization within the vehicle and moving object detection outside the vehicle. In the outside schedule mode, the UWB anchors perform localization of the one or more mobile devices outside the vehicle and moving object detection and/or localization inside and/or outside the vehicle.

20 Claims, 13 Drawing Sheets

(51) Int. Cl.
*G01S 13/02* (2006.01)
*G01S 13/56* (2006.01)

(58) Field of Classification Search
CPC ... G01S 2013/9315; G01S 2013/93274; G01S 5/14; G01S 7/006; G01S 7/0235
See application file for complete search history.

(56) References Cited

U.S. PATENT DOCUMENTS

| | | | | |
|---|---|---|---|---|
| 10,926,738 | B1 * | 2/2021 | Tucci | B60R 25/22 |
| 11,576,028 | B2 | 2/2023 | Lee et al. | |
| 12,061,250 | B2 * | 8/2024 | Ette | G01S 13/42 |
| 2020/0309932 | A1 * | 10/2020 | Zeng | G07C 5/08 |
| 2022/0377752 | A1 * | 11/2022 | Zhbankov | G01S 5/0263 |
| 2022/0383716 | A1 * | 12/2022 | Casamassima | H04B 1/7163 |
| 2022/0390586 | A1 * | 12/2022 | Ye | G01S 13/765 |
| 2023/0319811 | A1 * | 10/2023 | Jain | H04B 1/69 |
| 2023/0324545 | A1 | 10/2023 | Nagase et al. | |
| 2024/0192347 | A1 * | 6/2024 | Tertinek | G01S 13/003 |
| 2024/0345235 | A1 * | 10/2024 | Saracevic | G01S 13/003 |
| 2026/0067850 | A1 * | 3/2026 | Oh | G01S 5/14 |
| 2026/0101309 | A1 * | 4/2026 | Choi | H04W 64/00 |

* cited by examiner

UWB MOVING OBJECT DETECTION AND ALERTING

TECHNICAL FIELD

Aspects of the disclosure generally relate to scheduling ultra-wideband (UWB) radar and ranging sessions for detecting objects.

BACKGROUND

Phone trilateration using UWB technology is a method for precise location tracking and positioning. UWB uses very short pulses over a wide frequency spectrum, allowing for accurate distance measurements. In trilateration, the position of a device is determined by calculating the distances from three or more known reference points, typically UWB anchors. The device measures the time it takes for UWB signals to travel between it and each UWB anchor, converting these time-of-flight measurements into distance estimates. By using multiple distance measurements, the exact position of the device can be pinpointed, often within a few centimeters. This method is used in applications such as indoor navigation, asset tracking, and augmented reality.

Channel impulse responses (CIRs) may be used to provide radar functionality, in systems utilizing UWB technology. CIRs may represent a time-domain response of a signal as it travels through a channel, capturing the reflections, diffractions, and scattering of the signal off objects in the environment. By analyzing the CIRs, the presence, distance, and velocity of objects may be identified.

SUMMARY

In one or more illustrative examples, a method implemented by a controller of a vehicle for performing UWB radar and ranging sessions includes, responsive to one or more mobile devices being detected within a vehicle, activating an inside schedule mode with an inside scheduling of UWB radar sessions and UWB ranging sessions for UWB anchors of the vehicle; and responsive to the vehicle entering the key-off state, and no mobile devices being detected within the vehicle, activating an outside schedule mode with an outside scheduling of UWB radar sessions and UWB ranging sessions for the UWB anchors of the vehicle, wherein, in the inside schedule mode, the UWB anchors perform localization within the vehicle and moving object detection outside the vehicle, wherein, in the outside schedule mode, the UWB anchors perform localization of the one or more mobile devices outside the vehicle and moving object detection and/or localization inside and/or outside the vehicle.

In one or more illustrative examples, the method includes scheduling the UWB radar sessions and the UWB ranging sessions by configuring specific ones of the UWB anchors to send radar packets without overlapping with other UWB anchors and without interfering with slots reserved for ranging.

In one or more illustrative examples, the method includes utilizing unused time slots within ranging rounds for the radar sessions.

In one or more illustrative examples, the method includes utilizing unused ranging rounds for the radar sessions.

In one or more illustrative examples, the method includes utilizing a combination of unused time slots within an existing ranging round and unused ranging rounds for the radar sessions.

In one or more illustrative examples, the method includes alternating between the UWB radar sessions and the UWB ranging sessions in a time-synchronous manner; during the UWB ranging sessions, calculating distances from at least three of the UWB anchors to determine the position of a mobile device; and during the UWB radar sessions, using the UWB anchors to detect and track presence and movement of objects around the vehicle by analyzing returned radar signals.

In one or more illustrative examples, the method includes in the UWB radar sessions transmitting radar messages; receiving and monitoring channel impulse response (CIR) messages arising from the transmitted radar messages to detect a moving object in proximity to the vehicle; and calculating size and distance of detected objects based on the transmitted radar messages.

In one or more illustrative examples, the method includes in the inside schedule mode, alerting using a human machine interface (HMI) of the vehicle responsive to the detected moving object being within a predefined distance threshold to the vehicle.

In one or more illustrative examples, the method includes in the outside schedule mode, sending a notification to a mobile device of a user of the vehicle responsive to the detected moving object being within a predefined distance threshold to the vehicle.

In one or more illustrative examples, the method includes responsive to one of the UWB anchors being unable to join any of the UWB ranging sessions, establishing a connection between one of the UWB anchors that is joined to the UWB ranging sessions and the one of the UWB anchors unable to join, such that the UWB radar sessions can use the one of the UWB anchors unable to join to the UWB ranging sessions.

In one or more illustrative examples, a system for performing ultra-wideband (UWB) radar and ranging sessions includes a plurality of UWB anchors of a vehicle; and a controller of the vehicle, configured to: responsive to one or more mobile devices being detected within the vehicle, activate an inside schedule mode with an inside scheduling of UWB radar sessions and UWB ranging sessions for the UWB anchors of the vehicle, and responsive to the vehicle entering the key-off state, and no mobile devices being detected within the vehicle, activate an outside schedule mode with an outside scheduling of UWB radar sessions and UWB ranging sessions for the UWB anchors of the vehicle, wherein, in the inside schedule mode, the UWB anchors perform localization within the vehicle and moving object detection outside the vehicle, wherein, in the outside schedule mode, the UWB anchors perform localization of the one or more mobile devices outside the vehicle and moving object detection and/or localization inside and/or outside the vehicle.

In one or more illustrative examples, the controller is further configured to schedule the UWB radar sessions and the UWB ranging sessions by configuring specific ones of the UWB anchors to send radar packets without overlapping with other UWB anchors and without interfering with slots reserved for ranging.

In one or more illustrative examples, the controller is further configured to utilize unused time slots within ranging rounds for the radar sessions.

In one or more illustrative examples, the controller is further configured to utilize unused ranging rounds for the radar sessions.

In one or more illustrative examples, the controller is further configured to utilize a combination of unused time slots within an existing ranging round and unused ranging rounds for the radar sessions.

In one or more illustrative examples, the controller is further configured to alternate between the UWB radar sessions and the UWB ranging sessions in a time-synchronous manner; during the UWB ranging sessions, calculate distances from at least three of the UWB anchors to determine the position of a mobile device; and during the UWB radar sessions, use the UWB anchors to detect and track presence and movement of objects around the vehicle by analyzing returned radar signals.

In one or more illustrative examples, the controller is further configured to in the UWB radar sessions, transmit radar messages; receive and monitor channel impulse response (CIR) messages arising from the transmitted radar messages to detect a moving object in proximity to the vehicle; and calculate size and distance of detected objects based on the transmitted radar messages.

In one or more illustrative examples, the controller is further configured to in the inside schedule mode, alert using an HMI of the vehicle responsive to the detected object being within a predefined distance threshold to the vehicle; and/or in the outside schedule mode, send a notification to a mobile device of a user of the vehicle responsive to the detected object being within the predefined distance threshold to the vehicle.

In one or more illustrative examples, the controller is further configured to, responsive to one of the UWB anchors being unable to join any of the UWB ranging sessions, establish a connection between one of the UWB anchors that is joined to the UWB ranging sessions and the one of the UWB anchors unable to join, such that the UWB radar sessions can use the one of the UWB anchors unable to join to the UWB ranging sessions.

In one or more illustrative examples, a non-transitory computer-readable medium includes instructions that, when executed by a controller of a vehicle having a plurality of UWB anchors, causes the controller to perform operations including to: responsive to one or more mobile devices being detected within a vehicle, activate an inside schedule mode with an inside scheduling of UWB radar sessions and UWB ranging sessions for UWB anchors of the vehicle; and responsive to the vehicle entering the key-off state, and no mobile devices being detected within the vehicle, activate an outside schedule mode with an outside scheduling of UWB radar sessions and UWB ranging sessions for the UWB anchors of the vehicle, wherein, in the inside schedule mode, the UWB anchors perform localization within the vehicle and moving object detection outside the vehicle, wherein, in the outside schedule mode, the UWB anchors perform localization of the one or more mobile devices outside the vehicle and moving object detection and/or localization inside and/or outside the vehicle.

DETAILED DESCRIPTION

Figure 1:
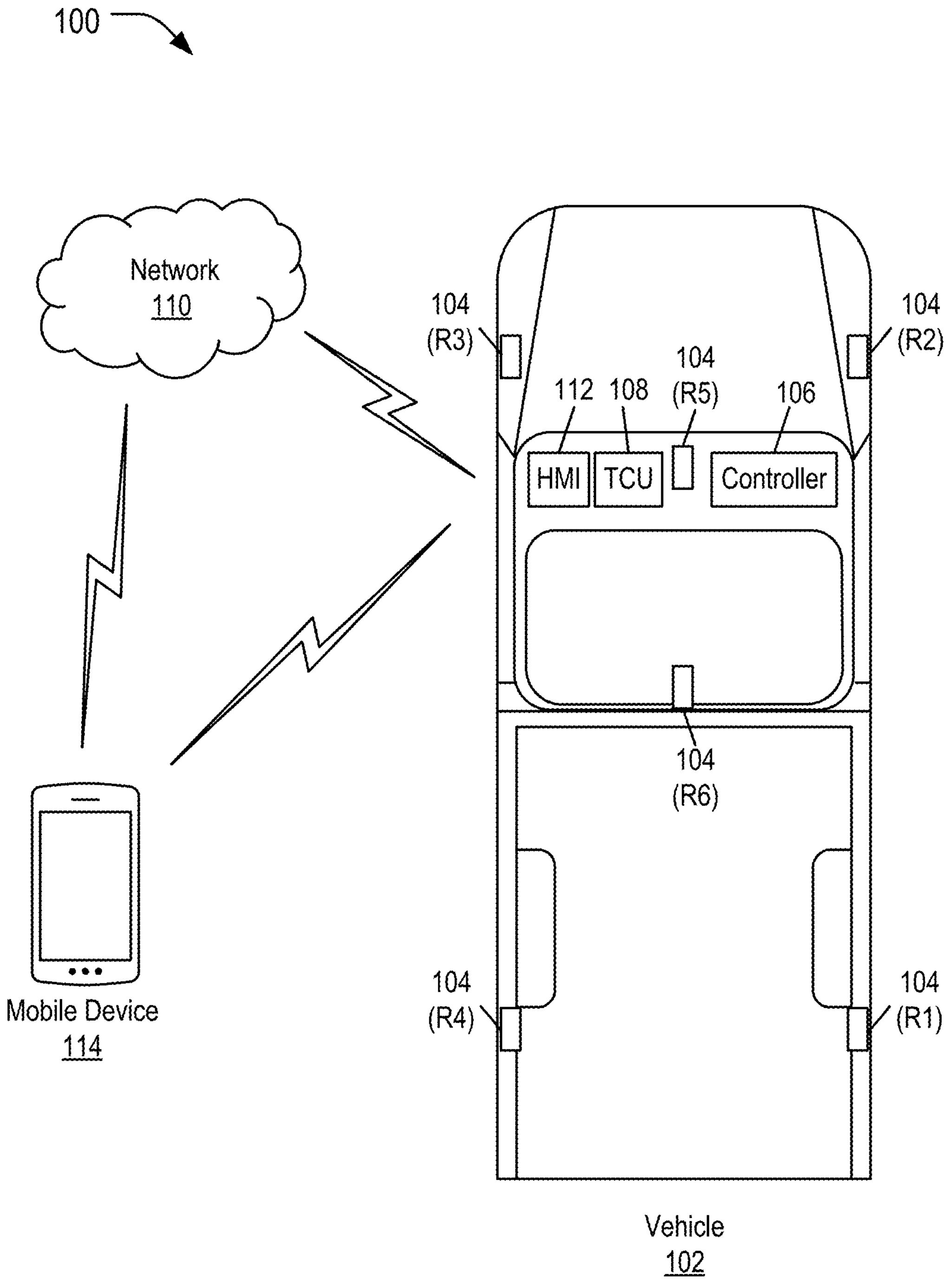
FIG. 1 illustrates an example system including a vehicle implementing UWB radar and ranging.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Current vehicle radar solutions may be cost-effective in terms of bill of materials. Yet, such systems may consume significant power. Thus, such systems should only be operated when the vehicle is on. Applications such as detecting an approaching bicycle before exiting the vehicle require sensors to be operational even when the vehicle is off. There is a need for a solution that is both cost-effective and low in energy consumption for this and similar use cases.

Moreover, there are scenarios where the driver or passenger may also benefit from detecting the objects and providing a warning when the vehicle is on. For example, a passenger or a rideshare customer leaving the vehicle could benefit from this warning. Also, a truck driver leaving a vehicle on to check on something outside of the vehicle can benefit from the detection of external objects.

Ultra-wideband (UWB) technology is currently being used in vehicle access use cases for precise localization. UWB also offers a low-power radar mode, which can be used to detect objects, including bicyclists. Multiple applications require either localization services or radar functions, or both, to operate simultaneously. Therefore, there is a need for a scheduling method for UWB devices that can manage both localization and radar functions, ensuring seamless and simultaneous service to multiple applications. This scheduling method should also consider the needs of the currently active applications.

Aspects of the disclosure leverages both existing radar and UWB technologies (including UWB radar and ranging/trilateration) to provide seamless service to applications. The disclosed approach may extend the Connected Car Consortium (CCC) Digital Key UWB media access control (MAC) standard, which deals with a ranging-only schedule.

While the vehicle is in the key-on state, the vehicle's existing radar/sensor technology is used to monitor object or person movement around the vehicle. When the vehicle stops, the system detects the intention (for example, if the vehicle stops on the side of the road, there is a high probability that someone will exit the vehicle). Upon detecting an intention for a user to exit the vehicle, the radar mode on the external UWB anchors may be activated.

The UWB radar can be turned on anytime the vehicle stops. Activating the UWB radar before the vehicle goes into low power mode allows the radar time to start detecting and calibrate against other sensors while the vehicle is still in a high-power state. Responsive to the vehicle entering key-off (the low-power mode), the legacy radars are turned off, and the UWB radars take over.

The UWB radar system involves specific external anchors sending packets configured for radar transmission. These transmissions may meet the following requirements: two UWB anchors should not transmit radar packets in the same slot, causing overlap, and UWB anchors should not transmit radar packets in slots reserved for ranging. The ranging may be controlled by each mobile device in the vicinity separately and independently. Additionally, the anchors covering certain desired areas outside of the vehicle need to be periodically active.

The disclosed approach may utilize different periodicities for different sides of the vehicle to capture varying target speeds. The UWB radar and ranging timing schedulers may be designed to be time-synchronous, utilizing MAC layer level scheduling to support both ranging and radar functionality. This approach may consume significantly less power compared to mm-wave radar and cameras. If the vehicle is locked, the user may receive an alert based on any detected movement near the vehicle through Bluetooth or cellular networks. Alternatively, the vehicle may detect that there is still someone present in the vehicle who does not carry am authorized mobile device and make an alert available in the vehicle interior which could warn the person inside the vehicle, that there is a potential collision with the detected object moving outside the vehicle. The disclosed approach may detect the size of the object, differentiate between objects, generate appropriate alerts, and avoid false alarms. The disclosed schedulers may support UWB ranger devices in dual mode, enabling both ranging and radar functions to detect the authenticated user's position and moving objects outside the vehicle. Further aspects of the disclosure are discussed in detail herein.

FIG. 1 illustrates an example system 100 including a vehicle 102 implementing UWB radar and ranging. As shown, the vehicle 102 includes a plurality of UWB anchors 104, a controller 106, a telematics control unit (TCU) 108 in communication with a communications network 110, and an human machine interface (HMI) 112. The system 100 may be used to track the position of mobile devices 114 and/or other objects inside and outside of the vehicle 102.

Referring more specifically to FIG. 1, the vehicle 102 may be any passenger or commercial automobile such as a car, a truck, a sport utility vehicle, a crossover, a van, a minivan, a taxi, a bus, etc. The vehicle 102 may include various types of automobile, crossover utility vehicle (CUV), sport utility vehicle (SUV), truck, recreational vehicle, motorcycle, boat, plane or other mobile machine for transporting people or goods. Such vehicles 102 may be human-driven or autonomous. In many cases, the vehicle 102 may be powered by a gasoline, diesel, or hydrogen engine. As another possibility, the vehicle 102 may be a battery electric vehicle (BEV) powered by one or more electric motors. As a further possibility, the vehicle 102 may be a hybrid electric vehicle (HEV) powered by both an engine and one or more electric motors, such as a series hybrid electric vehicle, a parallel hybrid electrical vehicle, or a parallel/series hybrid electric vehicle.

The UWB anchors 104 communicate wirelessly with the mobile device 114 using radio waves. The UWB anchors 104 use an ultra-wideband signal, e.g., a signal with a low energy level spread over a wide frequency channel resulting in very low power spectral density level typically regulated by government agencies. The Federal Communications Commission and the International Telecommunications Union Radiocommunication Sector define ultra-wideband as an antenna transmission for which emitted signal bandwidth exceeds the lesser of 500 MHz or 20% of the arithmetic center frequency. The UWB anchors 104 may use any suitable modulation method, e.g., orthogonal frequency-division multiplexing (OFDM), phase-shift keying (PSK), pulse-position modulation (PPM), etc.

To enable robust user localization, the vehicle 102 may be equipped with UWB responders that are strategically positioned in the interior of the vehicle 102 and within the body structure to provide UWB network coverage of the environment in and around the vehicle 102, i.e., where the mobile device 114 of the user may be located. Depending on the physical design and shape of the vehicle 102, some of the UWB anchors 104 may be placed inside the body walls of the vehicle 102 (e.g., four respectively placed near or/at each corner of the front and rear bumpers of the vehicle 102), center console (e.g., between the driver and passenger seats) and inside the roof (e.g., near the front center, near the rear center).

As shown in the example of FIG. 1, six UWB anchors 104 are shown. These include a first UWB anchor 104 (R1), a second UWB anchor 104 (R2), a third UWB anchor 104 (R3), a fourth UWB anchor 104 (R4), a fifth UWB anchor 104 (R5), and a sixth UWB anchor 104 (R6). The UWB anchors 104 are spaced apart from each other, e.g., spread over the vehicle 102, to increase the ability to distinguish a location when used for trilateration. For example, four of the UWB anchors 104 may be located at respective corners of the vehicle 102 to maximize the horizontal spread of the UWB anchors 104, and the remaining two UWB anchor 104 are located internally to a footprint of the vehicle 102, in many cases at different heights than the corner-mounted UWB anchors 104 to provide a vertical spread. To perform trilateration, computation of the intersection of three or more circles or spheres, may provide the location of the detected device.

The controller 106 may be a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The controller 108 can thus include a processor, a memory, etc. The memory of the controller 108 can include media for storing instructions executable by the processor as well as for electronically storing data and/or databases, and/or the controller 106 can include structures such as the foregoing by which programming is provided. Further details of the controller 106 are discussed with respect to FIG. 2.

The TCU 108 is a controller of the vehicle 102 that may be utilized for communication over a communications network 110. In an example, TCU 108 may be configured to provide telematics services to the vehicle 102. These services may include, as some non-limiting possibilities, navigation, turn-by-turn directions, vehicle health reports, local business search, accident reporting, and hands-free calling. The TCU 108 may include network hardware configured to facilitate communication between the vehicle 102 and other devices of the system 100. For example, the TCU 108 may include or otherwise access a cellular modem configured to facilitate communication with the communications network 110. The communications network 110 may include one or more interconnected communication networks 110 such as the Internet, a cable television distribution network, a satellite link network, a local area network, and a telephone network, as some non-limiting examples. The communications network 110 may provide communications services, such as packet-switched network services (e.g., Internet access, voice over internet protocol (VoIP) communication services), to devices connected to the communications network 110. For instance, the TCU 108 may access the communications network 110 via connection to one or more cellular towers. In another example, the TCU 108 may access the communications network 110 via a Wi-Fi connection.

The HMI 112 may be configured to provide an interface through which the vehicle 102 occupants may interact with the vehicle 102. The interface may include a touchscreen display, voice commands, and physical controls such as buttons and knobs. The HMI 112 may be configured to receive user input via the various buttons or other controls, as well as provide status information to a driver (including information related to the disclosure, such as whether an object has been detected outside the vehicle 102, the locations of mobile devices 114, etc.), such as fuel level information, engine operating temperature information, and current location of the vehicle 102. The HMI 112 may be configured to provide information to various displays within the vehicle 102, such as a center stack touchscreen, a gauge cluster screen, etc. The HMI 112 may accordingly allow the vehicle 102 occupants to access and control various systems such as navigation, entertainment, and climate control.

The mobile devices 114 may include portable computing devices such as smart key fobs; mobile phones, e.g., smartphones; wearable devices, e.g., smartwatches, headsets, etc.; tablets; smart tools, etc. The mobile devices 114 are computing devices including respective processors and respective memories. The mobile devices 114 may be owned and carried by respective persons who may be operators and/or owners of the vehicle 102. In some cases, the mobile devices 114 may be configured to operate as access devices (e.g., phone as a key) to provide access to the vehicle 102.

Figure 2:
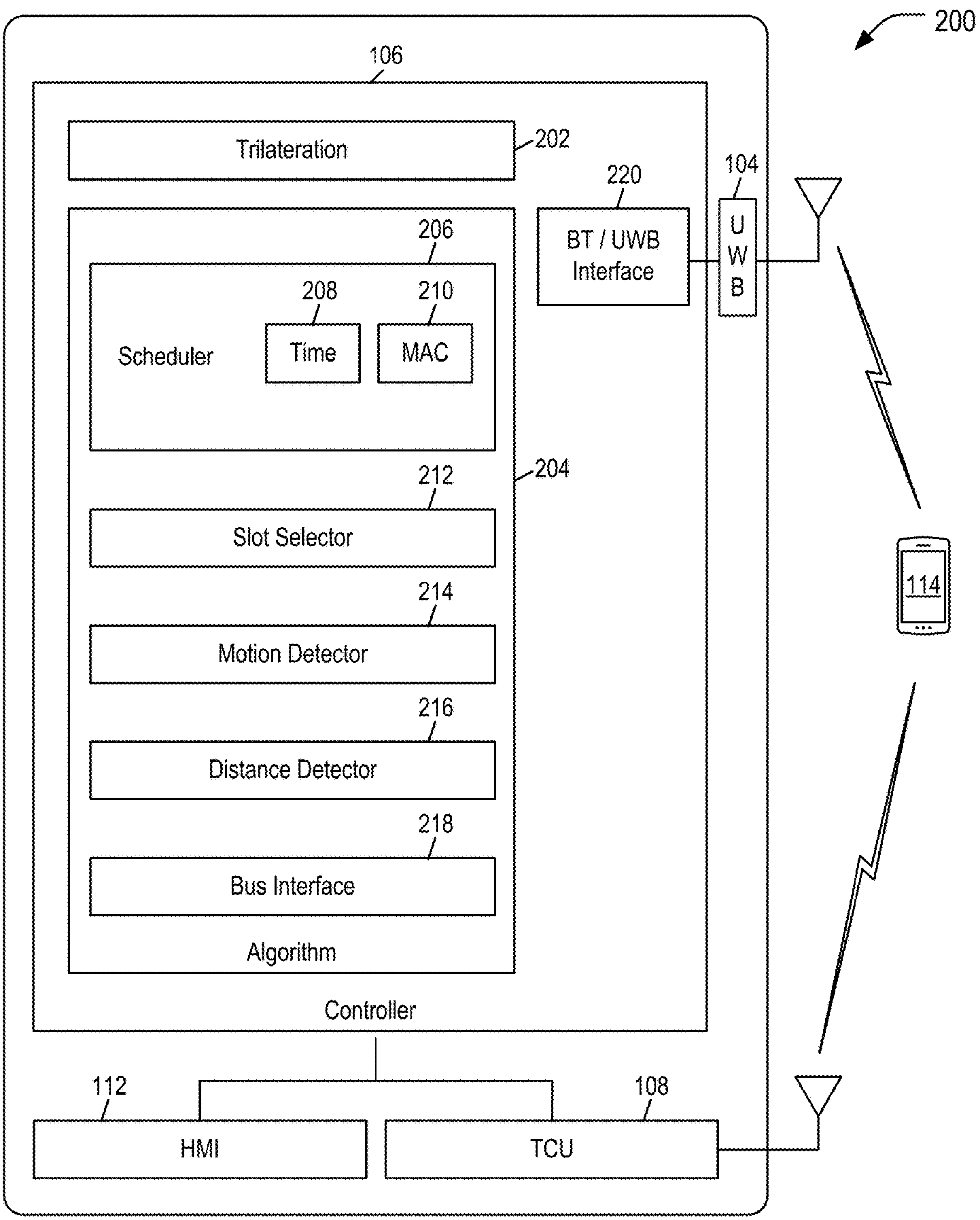
FIG. 2 illustrates further aspects of the controller of FIG. 1.

FIG. 2 illustrates further aspects of the controller 106 implementing UWB radar and ranging modes. As shown, the controller 106 may implement a trilateration algorithm 202 and also a radar ranging algorithm 204. The radar ranging algorithm 204 may include a scheduler 206 configured to utilize time scheduler 208 and MAC scheduler 210, a slot selector 212, a motion detection 214, a distance detector 216, and a bus interface 218. The controller 106 may also include a Bluetooth/UWB interface 220 for communication with the mobile device 114 over Bluetooth and/or UWB. Therefore, the controller 106 may also act as an additional anchor similar to UWB anchors 104. The controller 106 may be in communication through the back-end with the UWB anchors 104 and may also be in communication with the TCU 108 and the HMI 112.

Ranging mode in the context of UWB refers to the process of measuring the distance between the UWB devices and an object or another UWB device by calculating the time it takes for a signal to travel to and from the object. This mode relies on the time-of-flight (TOF) principle, where the time taken by a UWB signal to travel from the transmitter to the receiver is accurately measured, enabling precise calculation of distances. Ranging mode is essential for applications that require accurate location tracking, such as vehicle access systems, where it helps in determining the exact position of the user's mobile device 114 or key fob relative to the vehicle 102. To perform ranging between the vehicle UWB anchors 104 and the mobile device 114 a ranging session is established between the mobile device 114 and the UWB anchors 104, in that session the mobile device 114 being the initiator and the UWB anchors 104 being the responders. Ranging sessions can also be established separately between two or more UWB anchors 104 where one UWB anchor 104 is the initiator and the others are responders. In this disclosure, scheduling of the ranging and radar sessions initiated by the UWB anchors 104 is described under the constraints and the assumptions of ranging sessions being established between the vehicle UWB anchors 104 and the mobile devices 114 for the purpose of the mobile device localization.

Radar mode, on the other hand, involves using UWB technology to detect and track the presence and movement of objects around the vehicle 102. In this mode, UWB anchors 104 emit radar signals that bounce off nearby objects and return to the sensors. By analyzing the returned signals, the system can identify the size, shape, and movement patterns of these objects. For example, channel impulse response (CIR) may be used between the UWB anchors 104 to characterize the wireless environment of the vehicle 102. The CIR may describe how a wireless channel responds to an impulse signal, which is a very short signal, typically a 1-2 nanosecond pulse. The CIR captures the amplitude, phase, and delay of the multipath components that are sent from a transmitter and received by a receiver after reflecting, refracting, or scattering within the environment. By observing the multipath components of the CIR caused by scattering at target objects, movement of objects in and around the vehicle 102 may be detected. Radar mode is particularly useful for enhancing safety by detecting approaching vehicles 102, cyclists, or pedestrians, even when the vehicle 102 is in a low-power state. This mode allows the system to provide real-time alerts and take preventive measures, such as warning the user before opening the door in the path of an oncoming cyclist.

The trilateration algorithm 202 may implement the ranging mode by performing a computation of the intersection of three or more circles or spheres. The UWB anchors 104 may be configured to transmit and receive signals (within signal power thresholds) over UWB channel frequencies (e.g., UWB channel 9 (7.737-8.236 GHz) to Channel 5 (6.240-6.739 GHz) or other possible channels that are adopted by the UWB standard). Under ideal radio frequency (RF) conditions, e.g., when the mobile device 114 is located within the line of sight (LOS), three UWB anchors 104 may be sufficient in locating the mobile device 114, i.e., the initiator, and thereby enabling trilateration-based localization of the user through responder-to-initiator distance ranging. However, because of the possibility of less favorable RF conditions, data from more than three UWB anchors 104 may be utilized by the controller 106 to ensure there is adequate wireless UWB coverage to locate the mobile device 114.

The radar ranging algorithm 204 is configured to utilize the UWB anchors 104 to implement UWB radar and ranging. The radar ranging algorithm 204 utilizes the scheduler 206 to schedule which of the UWB anchors 104 are to operate in ranging mode and which of the UWB anchors 104 are to operate in radar mode. The scheduler 206 includes a time scheduler 208 that handles timing scheduling based on the position of the object to be tracked. The scheduler 206 also includes a MAC scheduler 210 that selects the ranging slots for radar operation. The radar ranging algorithm 204 utilizes the slot selector 212 to determine which wireless slots to use for radar and which to use for ranging. The motion detection 214 is configured to detect relative changes in position of detected objects over time with reference to the location of the vehicle 102. The distance detector 216 is configured to detect distances of detected objects from the vehicle 102.

The bus interface 218 may be configured to allow the controller 106 to transmit and receive data through a vehicle bus such as a controller area network (CAN) bus, Ethernet, WiFi, Local Interconnect Network (LIN), onboard diagnostics connector (OBD-II), and/or by any other wired or wireless communications network 110. The controller 106 may be communicatively coupled to the UWB anchors 104, the TCU 108, the HMI 112, and/or other components via the communications network 110.

The Bluetooth/UWB interface 220 may be configured to allow the controller 106 to transmit signals wirelessly through the UWB communications that are used by the UWB anchors 104. Also, the Bluetooth/UWB interface 220 may support other protocols, such as cellular, Bluetooth®, BLUETOOTH Low Energy (BLE), WiFi, Institute of Electrical and Electronics Engineer (IEEE) standard 802.11a/b/g/p, cellular-V2X (CV2X), Dedicated Short-Range Communications (DSRC), etc. In other examples, the Bluetooth/UWB interface 220 functionality may be implemented in whole or in part using the TCU 108. In an example, the controller 106 may use the connectivity of the TCU 108 for BLE.

Figure 3B:
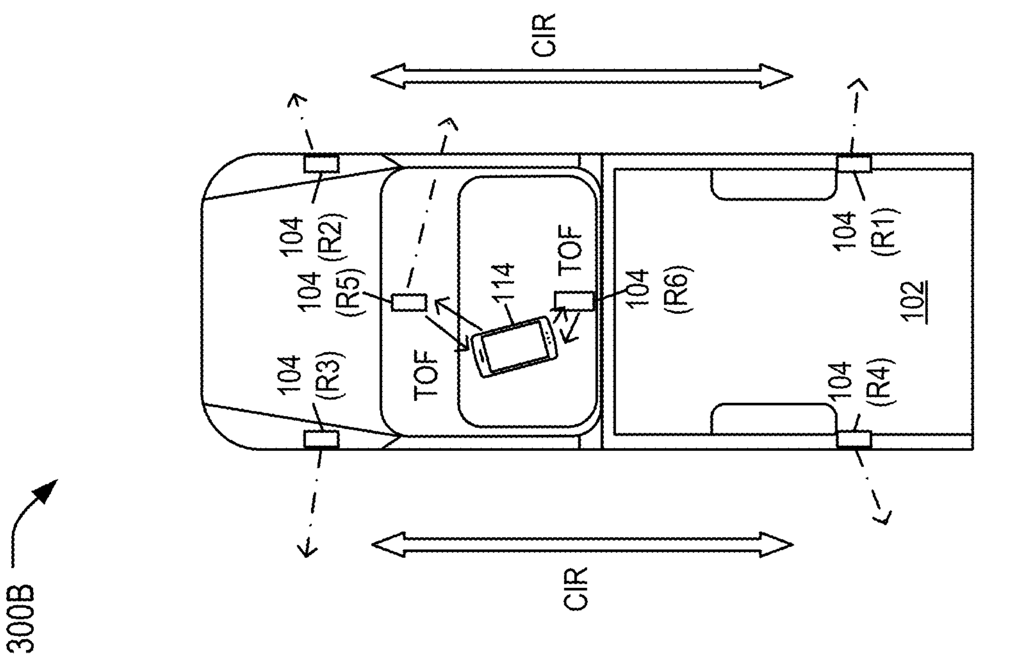
FIG. 3B illustrates an example diagram of the controller operating in the inside mode where a mobile device is within the cabin of the vehicle, in a second block in which radar is performed.
Figure 3A:
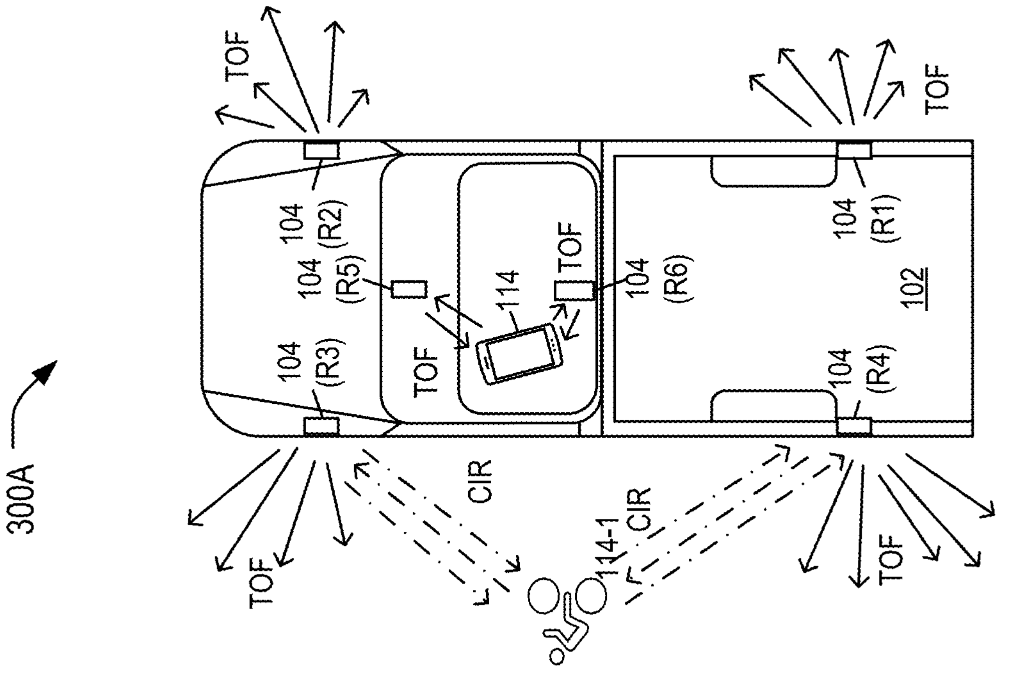
FIG. 3A illustrates an example diagram of the controller operating in an inside mode where a mobile device is within the cabin of the vehicle, in a first block in which both ranging and radar are performed.

FIGS. 3A-3B collectively illustrate the controller 106 operating in an inside mode where a mobile device 114 is within the cabin of the vehicle 102. In the inside mode, the controller 106 performs ranging and radar scheduling for tracking the mobile device 114 inside the vehicle 102 as well as for detecting moving objects near the vehicle 102. FIG. 3A illustrates a first block in which both ranging and radar are performed. FIG. 3B illustrates a second block in which only radar function is being performed. A third option where only ranging function is performed in the block is omitted but it can be easily deduced from the shown two examples.

Referring to FIG. 3A, the arrows represent the ranging and radar messaging provided by the system to locate moving objects around the vehicle 102. The solid arrows indicate TOF, while the dot-dash arrows represent the radar signals detecting an approaching cyclist 302.

In this scenario, where the vehicle 102 is turned off and the user remains inside the vehicle 102 with the mobile device 114 the UWB anchors 104 in the vehicle broadcast UWB MAC messages every 192 milliseconds (which is a configurable parameter) in a specific pattern to support both ranging and radar time-synchronous scheduling functionality. When a cyclist approaches the vehicle 102 from behind with the intention of passing by, the UWB anchors 104 in low power mode broadcast messages to monitor the surroundings.

The controller 106 operates in blocks of time, alternating between ranging and radar modes to ensure comprehensive coverage. (An example pattern is discussed below with respect to operation 810 of the process 800.)

The MAC Layer scheduling, explained in detail with respect to FIGS. 6A-6E, ensures that the UWB anchors 104 work efficiently in dual-mode ranging and radar to detect the user's position inside the vehicle 102 and moving objects outside the vehicle 102.

Additionally, the radar ranging algorithm 204 continuously monitors UWB CIR messages to detect any moving objects near the vehicle 102. If the driver or any passenger touches the car door handle, the radar ranging algorithm 204 provides a chime or other indication via the HMI 112 to warn the user from opening the door. This comprehensive system aims to enhance safety by accurately detecting and responding to objects and movements around the vehicle 102.

Figure 4B:
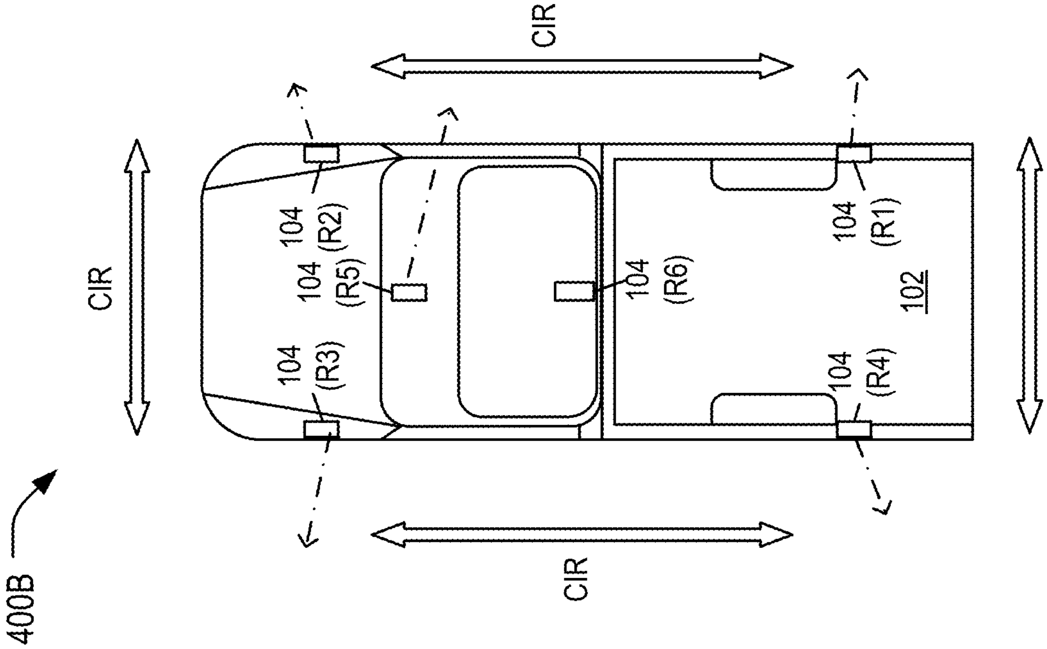
FIG. 4B illustrates an example diagram of the controller operating in the outside mode without any mobile devices within the cabin of the vehicle, in a second block in which radar is performed.
Figure 4A:
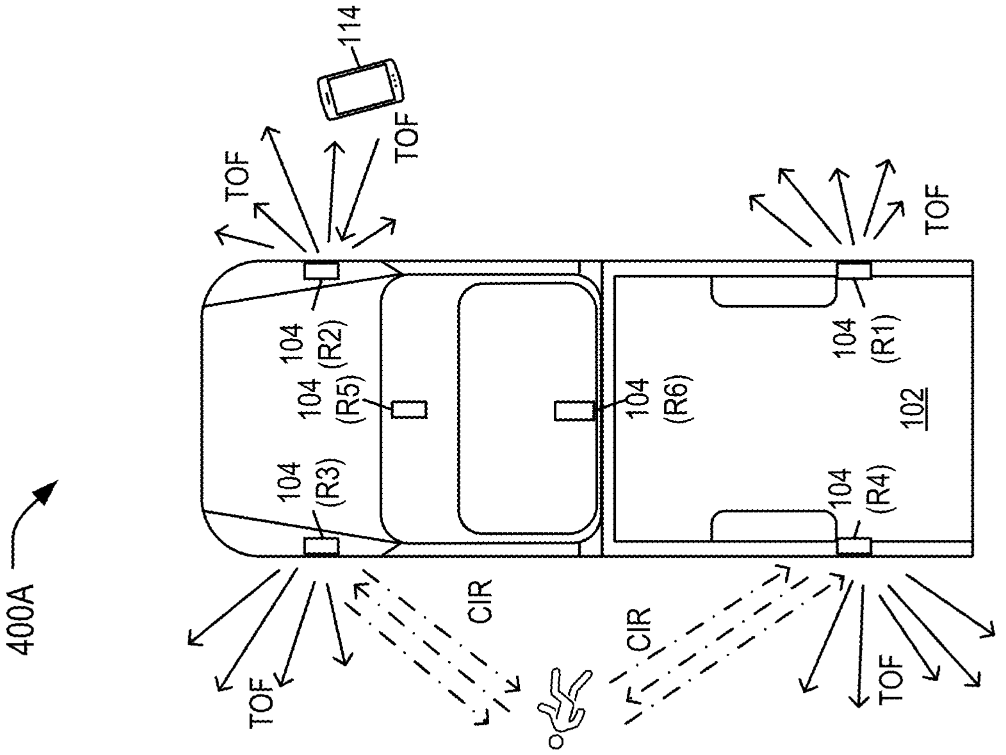
FIG. 4A illustrates an example diagram of the controller operating in an outside mode without any mobile devices within the cabin of the vehicle, in a first block in which ranging is performed.

FIGS. 4A-4B collectively illustrate an example diagram of the controller 106 operating in an outside mode without any mobile devices 114 within the cabin of the vehicle 102. In this scenario, the vehicle 102 has been turned off, and the user is no longer inside the vehicle 102. A person is passing by the vehicle 102. The UWB anchors 104 in the vehicle 102, now operating in low power mode, broadcast UWB MAC messages every 192 milliseconds to support ranging and radar time-synchronous scheduling functionality.

When the vehicle 102 is locked, and the user or mobile device 114 is outside the vehicle 102, the controller 106 alternates between ranging and radar modes in a structured pattern. (An example pattern is discussed below with respect to operation 812 of the process 800.)

The UWB anchors 104 operate in dual mode, alternating between ranging and radar functionalities. The radar ranging algorithm 204 continuously monitors the CIR messages to detect any moving objects, such as people or animals, near the vehicle 102. Responsive to detection, the radar ranging algorithm 204 may send a message to the mobile device 114, e.g., via Bluetooth or over the communications network 110. If someone touches or comes into very close proximity to the vehicle 102, the radar ranging algorithm 204 may notify the user and may activate a live video stream. The controller 106 may accordingly detect multiple passersby within the UWB range and notify the user accordingly. Alternatively, the vehicle may detect the presence of the persons inside the vehicle cabin left behind by the user who left the cabin with the mobile device 114, in which case the controller 106 may continue to provide alerts if the persons inside cabin are trying to exit when it is not safe to do so.

In the scenario shown in FIGS. 3A-3B, a focus is on detecting an approaching cyclist 302 while the user is still inside the vehicle 102. The controller 106 ensures that the user is aware of the cyclist to prevent accidents when exiting the vehicle 102. The UWB anchors 104 are in low power mode, broadcasting messages to detect movements like an approaching cyclist 302. The timing schedule alternates between ranging and radar modes to monitor the surroundings and ensure user safety inside the vehicle 102. Here, the chime is primarily for the user inside the vehicle 102 to warn about approaching cyclists 302 or other objects, preventing accidents when the user exits the vehicle 102.

To implement this using the UWB anchors 104, the controller 106 activates one sensor at a time during radar mode. This sequential activation pattern (using sensors R4, R1, R2, R3, and R5) focuses on specific areas around the vehicle 102, providing detailed monitoring to ensure the user's safety by detecting approaching objects like cyclists. The system alternates between ranging mode, which communicates with the user's mobile device 114 or key fob to confirm their position, and radar mode, which scans the surroundings.

In the scenario shown in FIGS. 4A-4B a focus is on detecting any moving objects or people near the vehicle 102 while the user is absent. The system must alert the user to potential security threats or other movements around the vehicle 102. Here, the UWB anchors 104 also operate in low power mode, but the messaging is more focused on external threats. The timing schedule still alternates between ranging and radar modes, but with additional functionality to notify the user via Bluetooth or cellular networks if any suspicious activity or close proximity is detected. In this situation, messages are sent to the mobile device 114 to notify of any movements or potential threats near the vehicle 102, as opposed to ensuring an easy exit from the vehicle 102.

To implement this using the UWB anchors 104, the controller 106 adopts a more comprehensive approach by activating two UWB anchors 104 simultaneously during radar mode. This pattern (combining sensors R1 and R2, and R3 and R4) allows for broader area coverage and faster detection of any movement near the vehicle 102. The focus shifts from ensuring the user's case of exit to monitoring the vehicle 102 for any suspicious activity. This dual activation pattern ensures that the vehicle 102 remains under constant surveillance, even when the user is not present.

Figure 5A:
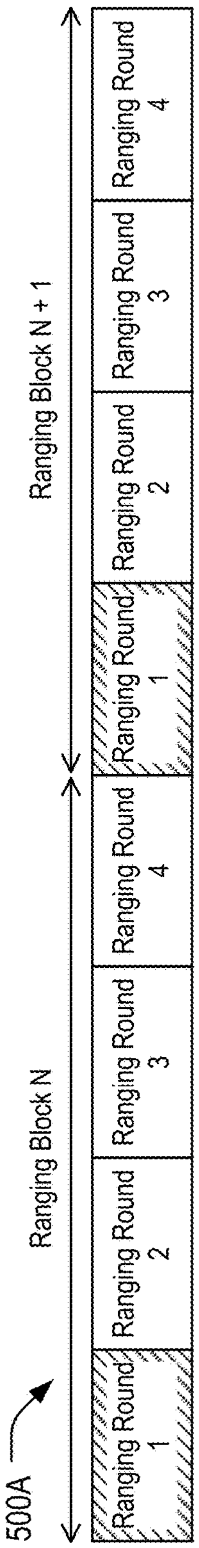
FIG. 5A illustrates an example of the scheduling of ranging sessions.
Figure 5B:
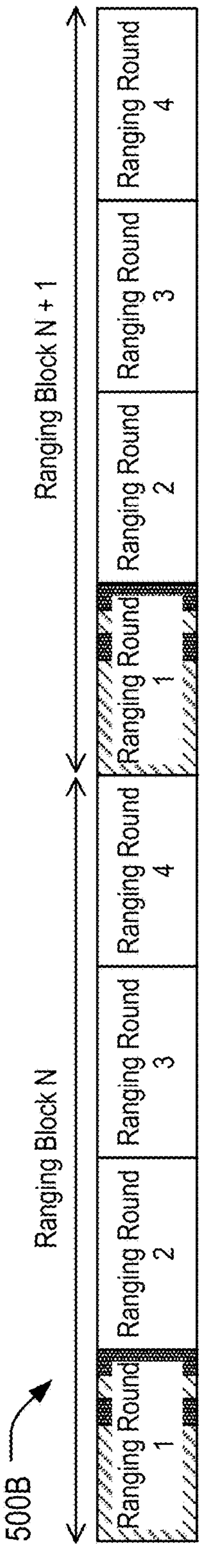
FIG. 5B illustrates an example of the scheduling of radar sessions in unused time slots within an existing ranging round.
Figure 5C:
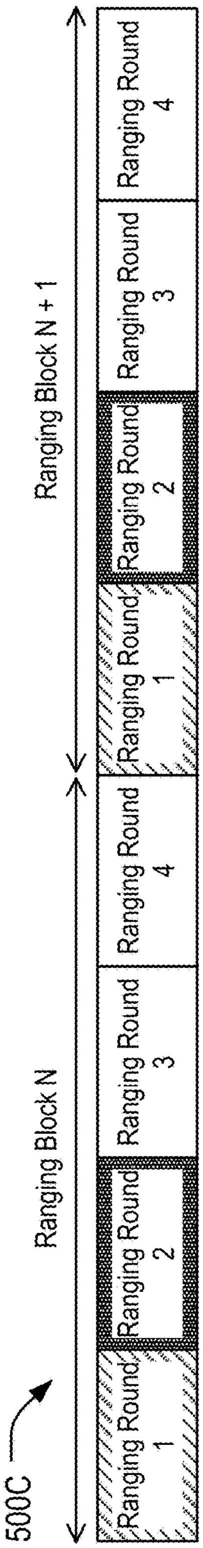
FIG. 5C illustrates an example of the scheduling of radar sessions in the unused ranging rounds.
Figure 5D:
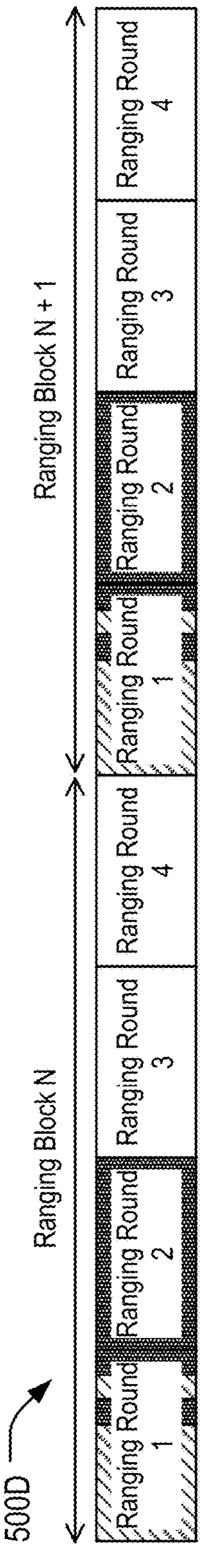
FIG. 5D illustrates an example of the scheduling of radar sessions both in unused time slots within an existing ranging round and also in the unused ranging rounds.

FIGS. 5A-5D collectively illustrate examples of scheduling ranging and radar sessions. FIG. 5A illustrates an example 500A of the scheduling of ranging sessions. FIG. 5B illustrates an example 500B of the scheduling of radar sessions in unused time slots within an existing ranging round. FIG. 5C illustrates an example 500C of the scheduling of radar sessions in the unused ranging rounds. FIG. 5D illustrates an example 500D of the scheduling of radar sessions both in unused time slots within an existing ranging round and also in the unused ranging rounds. Ranging time slots are shown as diagonal hatching, while radar timeslots are shown as dotted hatching.

It should be noted that the decision by the scheduler to leave certain ranging rounds may be based on monitoring of the channel in those rounds and determining that they are used by other UWB anchors 104. Similarly, the controller 106 may be aware of the multiple ranging sessions between UWB anchors 104 and the multiple mobile devices 114 that the user may have (smart phones, key fobs) which organize their sessions independently of each other. In that case the controller 106 may ensure that radar sessions synchronized with a certain mobile device 114 are not overlapping with the ranging and radar sessions synchronized with the another mobile device 114.

Referring more specifically to the example 500A, the CCC defines ranging sessions controlled by a device called an initiator, typically a mobile device 114. A handshake between the mobile device 114 and the UWB anchors 104 may occur during a specific ranging round within a time interval called a ranging block, which repeats periodically. As shown, a first ranging block N includes four ranging rounds (1 through 4), and a second ranging block N+1 includes a repeat of those four ranging rounds (1 through 4). The X axis represents time, such that in first ranging block N the first ranking round occurs, then the second, then the third, then the fourth, then the sequence repeats for the next first ranging block N+1. This process may continue indefinitely.

A repeating set of ranging rounds may be used by the controller 106 for performing the ranging. As shown the first ranging round is being used. It should be noted that the ranging rounds that are utilized may hop within the ranging block using a known hopping sequence, while the other non-highlighted ranging rounds are unused by the session.

Referring more specifically to the example 500B, an approach to scheduling radar transmissions is provided by utilizing unused time slots within the already used ranging round. This approach makes efficient use of the time slots available in the ranging block by fitting radar transmissions into the gaps left by the ranging process.

Referring more specifically to the example 500C, another approach to scheduling radar transmissions is provided by utilizing the unused ranging rounds. By dedicating entire ranging rounds to radar transmissions, this approach ensures that there is no interference between the ranging and radar functions, although it might use more overall time in the ranging block.

Referring more specifically to the example 500D, yet another approach combines the above two approaches, using a mix of unused slots in used ranging rounds and completely unused ranging rounds for radar transmissions. This hybrid approach aims to balance efficiency and dedicated time for radar functionality. The MAC Layer scheduling explained in FIGS. 6A-6E provides further details on how these approaches are implemented by the controller 106.

Figure 6A:
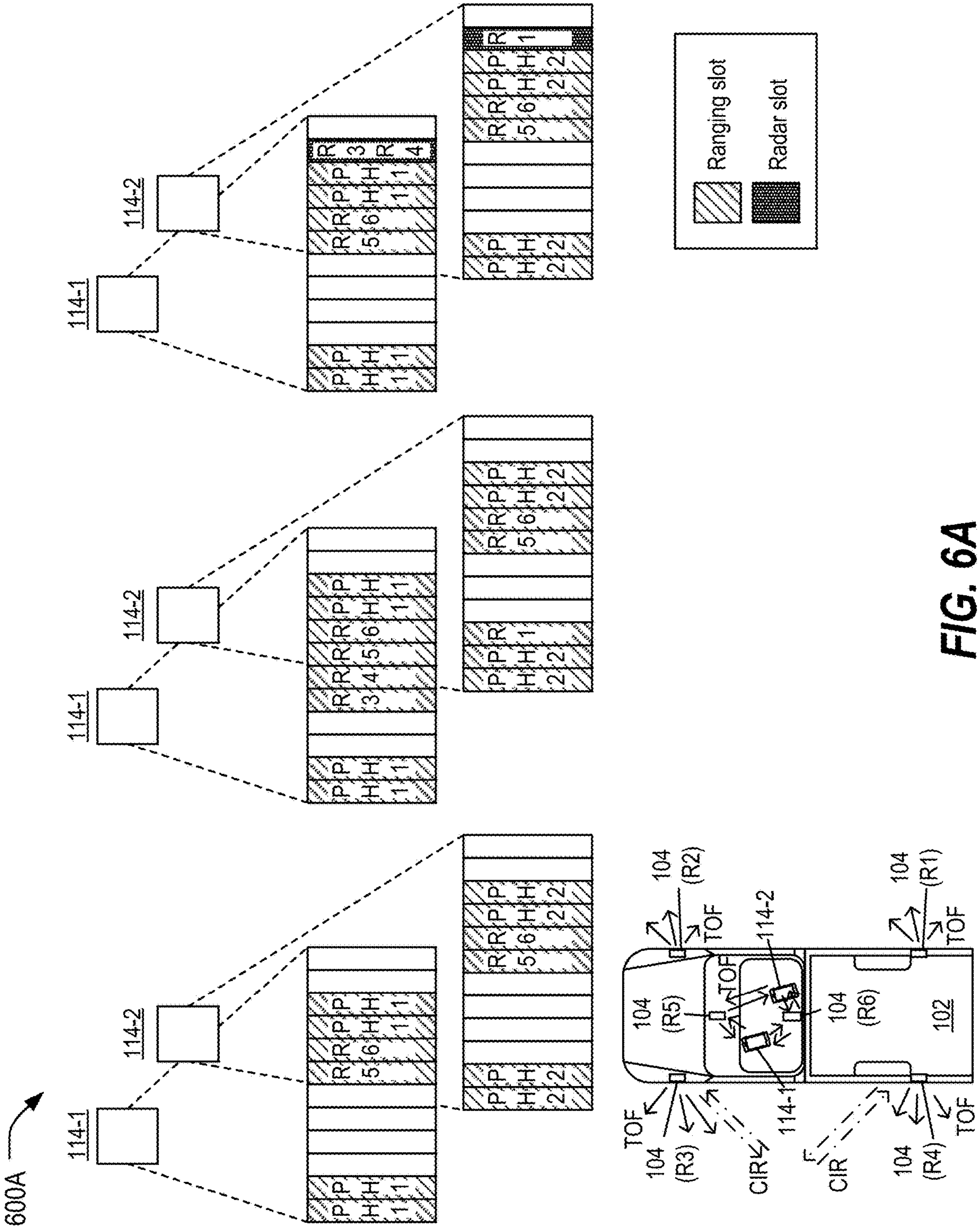
FIG. 6A illustrates an example of the controller setting up a radar session on top of an ongoing ranging session or as an extension of the case described by example in FIG. 5B.

FIG. 6A illustrates an example 600A of the controller 106 setting up a radar session on top of an ongoing ranging session or as an extension of the case described by example 500B. The context of the example 600A is that there are two mobile devices 114-1 and 114-2 presently located inside the vehicle 102. The example 600A shows a first ranging round to the left while the vehicle 102 is moving with the two mobile devices 114-1 and 114-2 inside the cabin of the vehicle 102. The example 600A also shows a second ranging round in the middle, where the vehicle 102 has stopped, and a third ranging round to the right, where radar functionality has been scheduled. Periodic ranging rounds are shown for the mobile device 114-1 and also for the mobile devices 114-2, which are shown expanded in the lower portion of the diagram for sake of explanation. The time axis proceeds from left to right.

When the vehicle 102 stops, the UWB anchors 104 may continue ranging the mobile devices 114-1 and 114-2 inside the cabin of the vehicle 102. As shown in the first ranging round, the UWB anchors 104 may not be performing ranging outside of the vehicle 102 at this time, as they may be instructed by the controller 106 to mute because the vehicle 102 was moving and the mobile devices 114 are inside.

As shown in the center ranging round responsive to the vehicle 102 stopping, the controller 106 instructs the outside UWB anchors 104 to begin ranging. This means that the outside UWB anchors 104 should rejoin the ranging sessions of the mobile devices 114-1 and 114-2 that are currently being ranged inside the cabin.

It is assumed in this example, that the R3 and R4 UWB anchors 104 can join the session of the mobile device 114-1 and that that R1 and R2 UWB anchors 104 do not receive the pre-POLL and POLL message from the phone mobile device 114-1. Continuing with the example 600A, the external responders (R1-R4) report to the controller 106 that R3 and R4 are able to rejoin the session with the mobile device 114-1. Thus, the controller 106 instructs the R3 and R4 UWB anchors 104 to begin using Slots #11 to send radar pulses in the alternating fashion and avoid using Slot #12 to avoid overlapping with ranging transmission R5 which is part of the ranging session of the mobile device 114-1. This is shown in the third ranging round at the right. If the overlap between the ranging sessions was not detected then both Slots #11 and Slot #12 may be available for radar transmissions.

If another phone is present (e.g., the mobile device 114-2), then R1 and R2 may reconnect to the session of that the mobile device 114-2. Here it is assumed that R1 re-connected and subsequently the controller 106 instructs R1 to use Slot #11 for radar. Yet, R2 is not included in any of the ranging sessions because R2 did not join any of the existing ranging sessions.

Figure 6B:
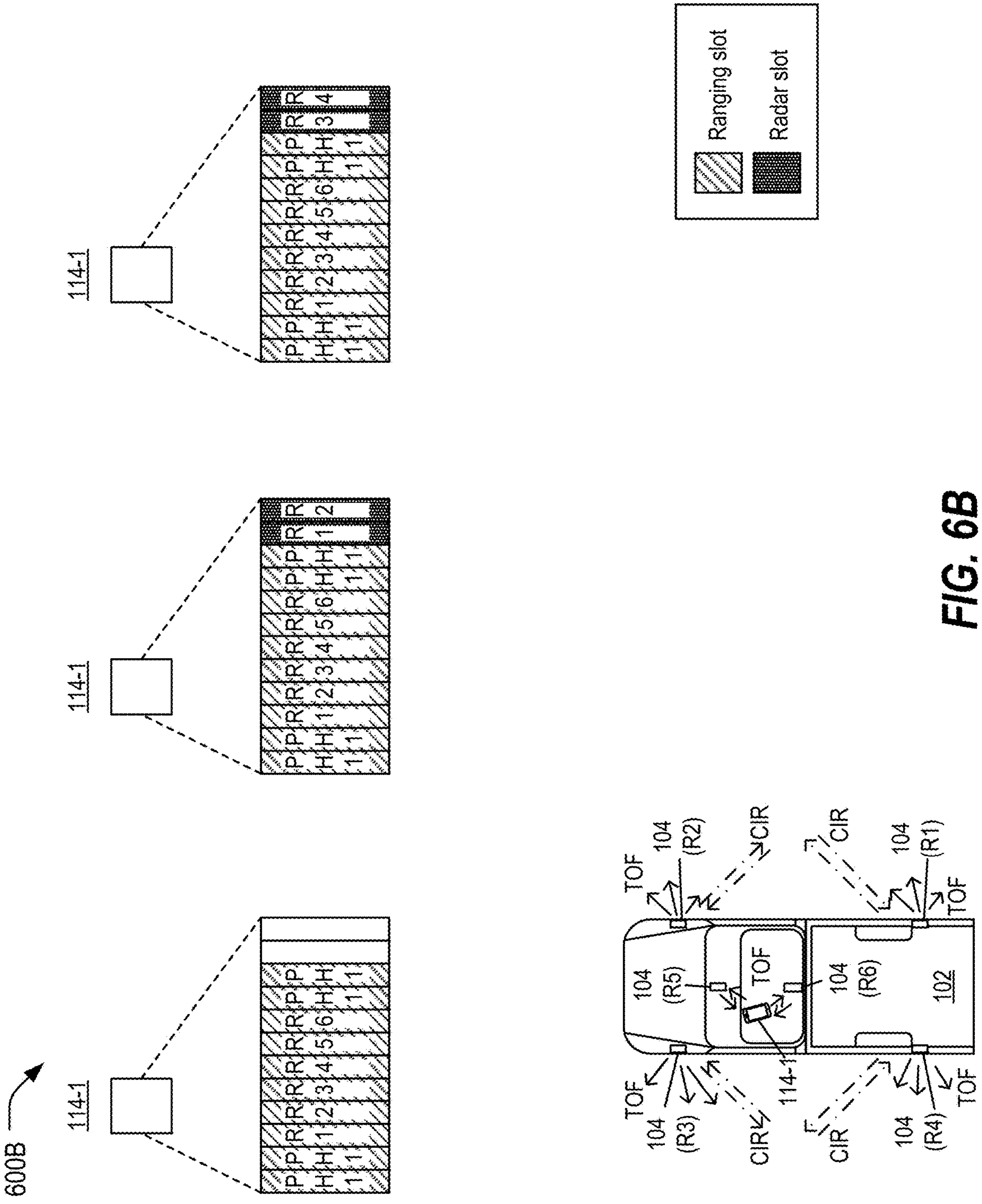
FIG. 6B illustrates an example of the controller setting up a radar session where the mobile device can communicate with all of the external UWB anchors.

FIG. 6B illustrates an example 600B of the controller 106 setting up a radar session where the mobile device 114-1 can communicate with all of the external UWB anchors 104. For completeness, this case is shown where after re-establishing the ranging session, and after assuming two slots are left, those remaining slots are used in a round-robin fashion by the external UWB anchors 104 to send radar packets. Here, the slots are alternated between R1 and R2, and R3 and R4.

Figure 6C:
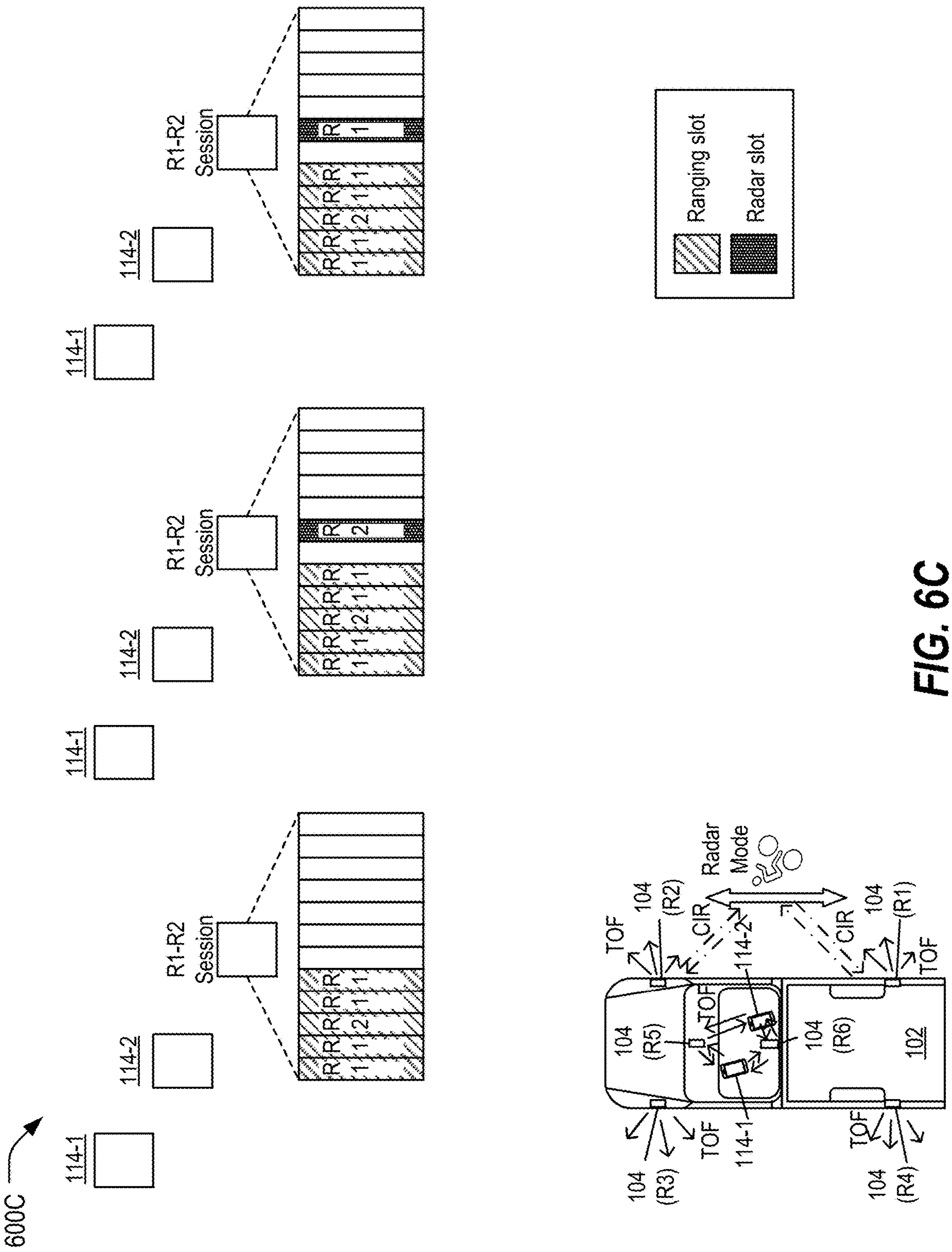
FIG. 6C illustrates an example of the controller setting up a radar session between R1 and R2 to address, as shown in the FIG. 6A, the lack of inclusion of R2 into any of the existing ranging sessions.

FIG. 6C illustrates an example 600C of the controller 106 setting up a radar session between R1 and R2 to address the lack of inclusion of R2 into any of the existing ranging sessions as shown in the example 600A. While it is possible for the controller 106 to instruct the anchor R2 to start transmitting radar pulses at pre-specified times the lack of accurate time reference at R2 from not participating in any of the on-going mobile device 114 initiated ranging sessions may cause transmission overlaps and collisions in that situation. As noted with respect to the example 600A, R2 is not included in any of the radar sessions because R2 did not join any of the existing ranging sessions.

This may not be an issue if motion is not anticipated around R2 or if the controller 106 is not instructing to detect motion around R2. If such detection is desired by the controller 106, then a solution may include establishing a session between R2 with another external anchor, for example R1, as illustrated by a double-sided arrow in the example 600C. As shown, R1 and R2 establish a ranging session. After the session is established, R2 is instructed by the controller 106 to send a radar packet in Slot #7. Such an approach may generally be used in cases where a UWB anchor 104 is not joined but where detection around that UWB anchor 104 is desired. Additionally, the choice of timing for the ranging session between R1 and R2 as initiated by R1 upon the instruction from the controller 106 is based on the information where the other ranging and radar sessions for the vehicle 102 occur in time, for example the sessions of mobile device 114-1 and 114-2, where this information may be communicated by the controller to the R1 both implicitly and explicitly.

Figure 6D:
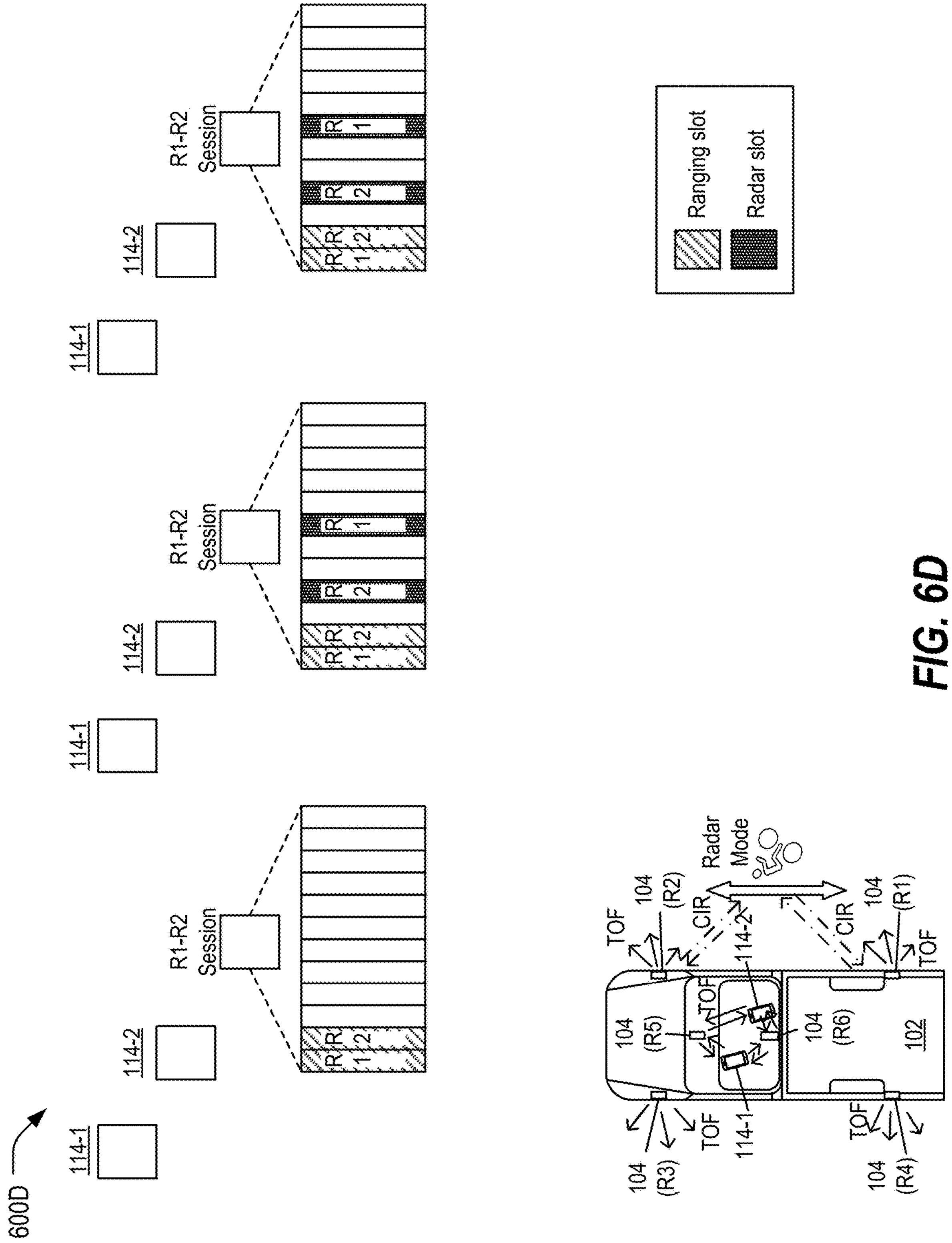
FIG. 6D illustrates a light-weight alternate example of the controller setting up a radar session between R1 and R2 to address the lack of inclusion of R2 into any of the existing ranging sessions.

FIG. 6D illustrates a light-weight alternate example 600D of the controller 106 setting up a radar session between R1 and R2 to address the lack of inclusion of R2 into any of the existing ranging sessions as shown in the example 600A. In the example 600C, the UWB anchors 104 R1 and R2 establish a regular ranging session which consumes at least five slots. In this light-weight alternate example 600E, the ranging session consuming only two slots per round for ranging and two for radar. Also in this example, an option is shown of scheduling R1 to send a radar packet as well. Similarly, the choice of the slots for the R1-R2 ranging session will take into account other sessions that the anchors 104 are part of and that controller 106 has information about.

Figure 6E:
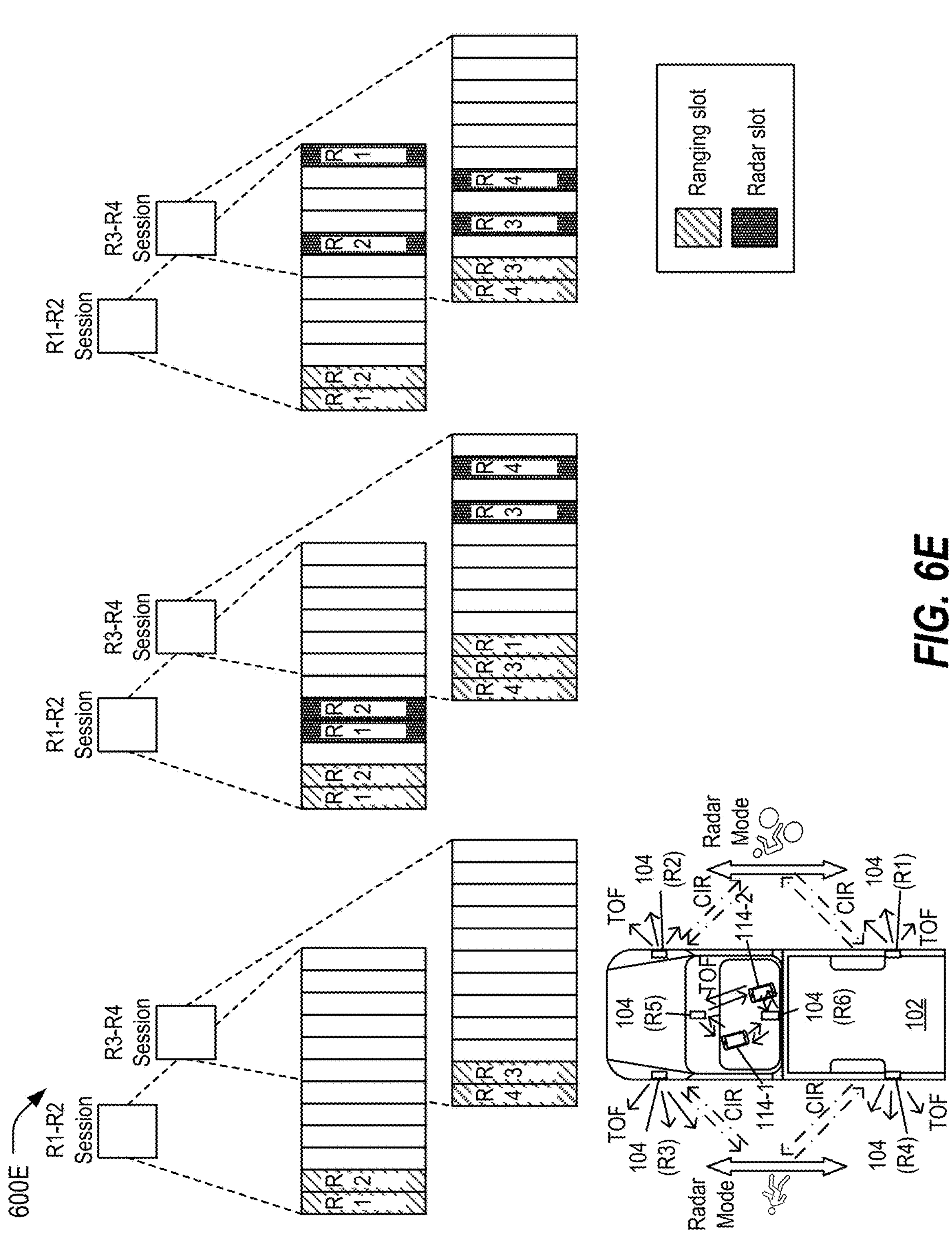
FIG. 6E illustrates an example of the controller setting up a sessions between R1 and R2 and between R3 and R4.

FIG. 6E illustrates an example 600E of the controller 106 setting up a session between R1 and R2 and between R3 and R4. This example 600E addresses a scenario in which none of the external anchors R1-R4 are in communication with the mobile devices 114-1 and 114-2 inside the cabin. In this scenario, the controller 106 instructs two anchors, e.g., R1 and R4, to establish a light session (this could be full ranging sessions as well) with R2 and R3, respectively. Responsive to the sessions being established, the anchors R1-R4 agree which slots they will use to send radar packets. Both the choice of the ranging session transmissions and the radar transmissions may be based on the information that controller 106 shares implicitly or explicitly about the ongoing sessions that exist between mobile devices 114-1 and 114-2 and the internal anchors 104 R5 and R6. This may include hopping between slots, as shown. The hopping may be driven by the information provided by the controller 106 in indicating that each choice would result in an overlap with the existing ranging and radar sessions and thus to avoid persistent overlap a time hopping is used.

Figure 7:
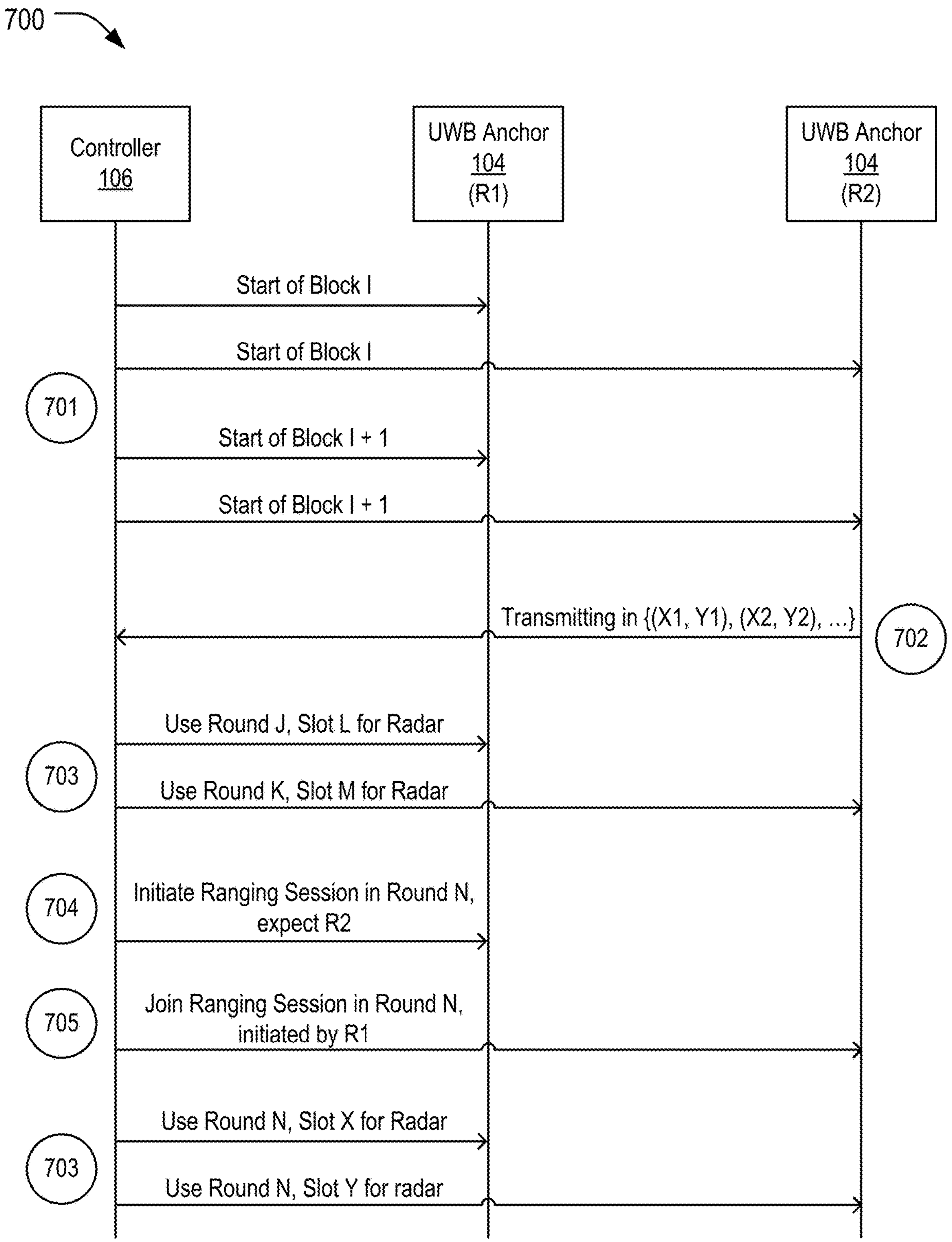
FIG. 7 illustrates an example data flow for the operation of the controller.

FIG. 7 illustrates an example data flow 700 for the operation of the controller 106. As shown, the data flow 700 illustrates the commands being sent from the controller 106 to schedule the UWB anchors 104 (R1 and R2 shown, but other examples would similarly include messaging to additional UWB anchors 104).

The operation labeled Start of Ranging Round indicates the beginning of a new ranging session initiated by the controller 106. This operation is useful for establishing communication between the controller 106 and the UWB anchors 104 (here R1 and R2). During the start of a ranging round, the anchors R1, R2 are synchronized to begin the process of measuring distances by exchanging ranging signals.

The controller 106 establishes synchronization with the anchors 104 by sending a periodic Beacon 701 indicating Start of Block I, where I is an increasing index. This way by indicating a particular Round it would be a round relative to the beginning of a Block. Next, the anchors may communicate using a message 702 in which rounds and slots they are transmitting as part of the on-going sessions, where (X1, Y1) refers to a round X1 and slot Y1 inside round X1. Round X1 is repeating in any Block and is calculated with respect of the ongoing Block. Next, the controller 106 may send a command 703 to an anchor 104 to instruct it to use a particular (Round, Slot) for radar. Next, for the case when R2 is not part of any session the controller 106 may send a command 704 to instruct R1 to start a session with R2. At the same time the controller 106 may send a command 705 to R2 to join the session initiated by R1.

Next, the controller 106 indicates, to the anchors R1, R2, the ranging rounds and slots within the rounds that the anchors R1, R2 are scheduled to use for radar. In this operation, the controller 106 instructs the UWB Anchor 104 R1 and UWB Anchor 104 R2 to utilize specific slots (L and M) within a given ranging round (Round K) for radar transmissions. This means that within the time allocated for Round K, slots L and M are reserved for radar pulses. This enables the system to perform radar functions such as detecting moving objects or obstacles while maintaining the ongoing ranging session.

As shown, each of the anchors R1, R2 send a message to the controller 106 indicating the beginning of a ranging round. Next, the controller 106 indicates, to the anchors R1, R2, the ranging rounds and slots within the rounds that the anchors R1, R2 are scheduled to use for radar. Next, the controller 106 directs the anchors R1, R2 to perform the ranging. Here, the anchor R1 is started to perform the round N using the scheduled slot L for radar. Additionally, the anchor R2 is joined to the ranging round, using the scheduled slot M for radar.

Next, at the Start Round N, Use Slot L for Radar operation, this signifies the initiation of a new ranging round (Round N), with Slot L being designated for radar transmissions by UWB Anchor 104 R1. The controller 106 starts this new round to continue the process of monitoring the surroundings, ensuring that the radar pulses are transmitted at the specified time slot to detect objects.

Next, at the Join Round N, Use Slot M for Radar operation, this indicates that the UWB Anchor 104 R2 is joining an already ongoing ranging round (Round N) and is instructed to use Slot M for radar transmissions. This means that R2 synchronizes with the ongoing session and starts transmitting radar pulses in the specified slot. The join operation ensures that R2 can integrate into the ongoing session without disrupting the established communication protocol.

These operations illustrate the coordination between the controller 106 and the UWB anchors 104 (e.g., R1, R2) to ensure seamless integration of ranging and radar functionalities. The scheduler 206 within the controller 106 manages the timing and slot allocation, allowing for efficient use of resources while maintaining continuous monitoring and detection capabilities. The start and join operations are useful for establishing and maintaining synchronization between the controller 106 and the UWB anchors 104, enabling effective communication and radar pulse transmissions. It should be noted that the controller 106 may also instruct any of the anchors 104 to stop either ranging or radar activities.

Figure 8:
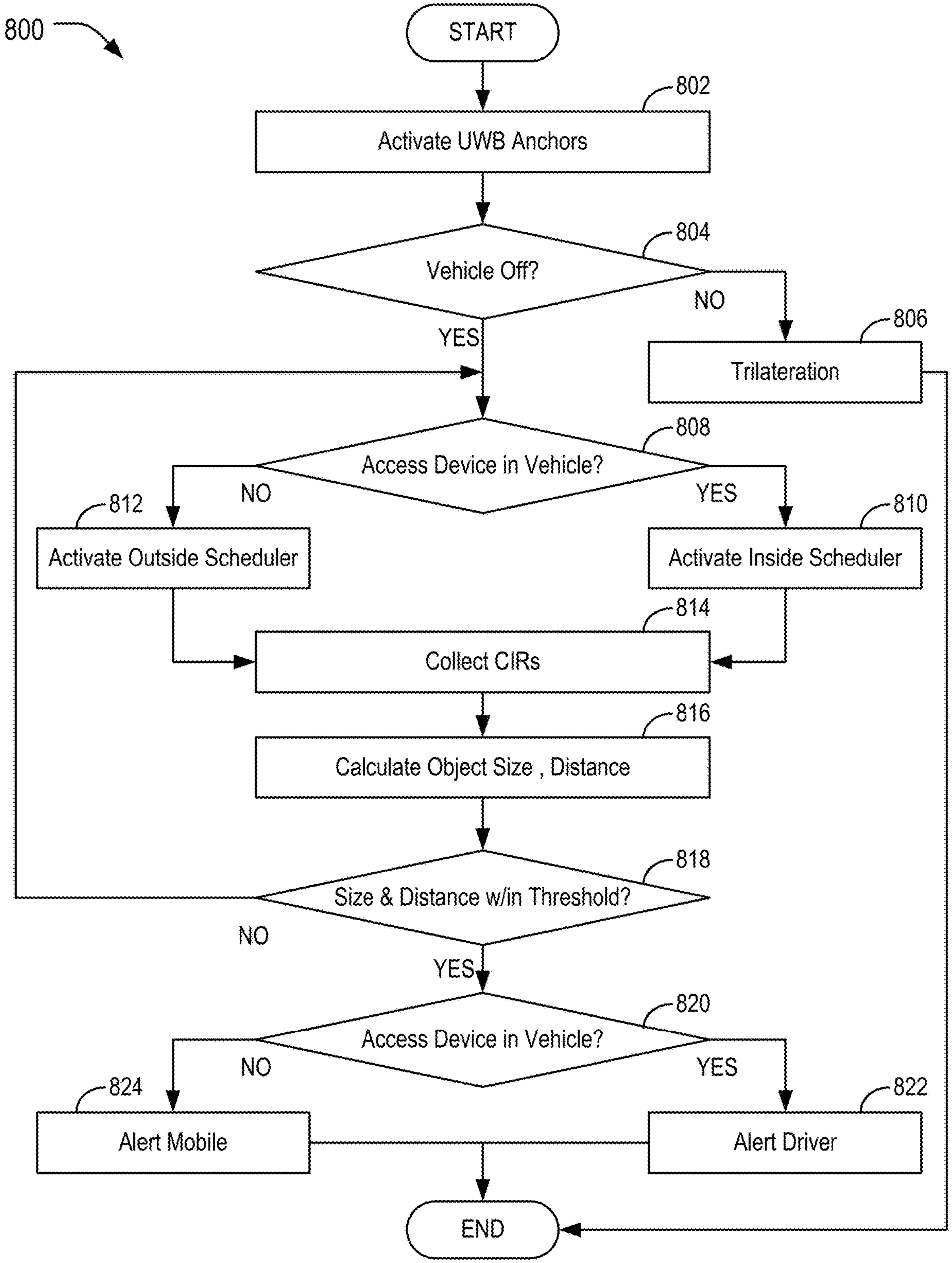
FIG. 8 illustrates an example process for implementing UWB radar and ranging.

FIG. 8 illustrates an example process 800 for implementing UWB radar and ranging. In an example the process 800 may be performed by the controller 106 of the vehicle 102 in the context of the system 100 discussed in detail herein.

At operation 802, the controller 106 activates the UWB anchors 104 to initiate monitoring of the surroundings of the vehicle 102. This may occur when the vehicle 102 is turned on, approached, or otherwise activated.

At operation 804, the controller 106 determines whether the vehicle 102 is off. In an example, a user inside the vehicle 102 may turn off the vehicle 102. The user may stay within the vehicle 102 for a period of time, or may exit the vehicle 102. If the vehicle 102 is on, the controller 106 proceeds to step 806. If the vehicle 102 is off, control proceeds to operation 808.

At operation 806, the controller 106 uses the UWB anchors 104 to performs trilateration to determine the positions of devices within the vehicle 102. In trilateration, the position of a mobile device 114 may be determined by calculating distances from three or more of the UWB anchors 104. The controller 106 may measure the time it takes for UWB signals to travel between the mobile device 114 and the UWB anchors 104, converting these time-of-flight measurements into distance estimates. By using multiple distance measurements, the position of the mobile device 114 may be pinpointed. In this portion of the process 800 the radar mode of operation is not used. After operation 806, the process 800 ends.

At operation 808, responsive to determining that the vehicle 102 is turned off, the controller 106 determines whether there is a mobile device 114 inside the vehicle 102. This may be accomplished similar to the trilateration discussed with respect to operation 806, with the further comparison whether the determined location of the mobile device 114 is inside or outside the cabin of the vehicle 102. If there is a mobile device 114 present, control proceeds to operation 810. If not, control proceeds to operation 812.

It may also be noted that as long the UWB radar detects an object and there is a need to warn the user, locating the user may be done using trilateration or another approach that is available to the vehicle. The user may carry a keyfob or other access device to be located and made vibrate in a certain pattern for example. The user may not have a UWB keyfob, but could still be notified via an application installed to the user's mobile device 114, by an alert or other notification provided to the user's mobile device 114, activation of lights or horn of the vehicle 102, etc.

At operation 810, the controller 106 activates the inside scheduler mode of operation. This scheduler 206 manages the timing and operation of the UWB anchors 104 for detection inside and outside the vehicle 102, broadcasting UWB MAC messages every 192 milliseconds to support ranging and radar functions. The pattern below may be used as an example to support Ranging and Radar Time synchronous scheduling functionality:

| Block 1: | |
|---|---|
| Ranging mode: | (Tx/Rx: phone + all anchors, 0-24 ms) |
| Radar mode: | (Tx: R4, 24-48 ms) |
| Radar mode: | (Tx: R1, 48-72 ms) |
| Idle | (72-96 ms) |
| **Block 2:** | |
| Ranging mode: | (Tx/Rx: phone + all anchors, 96-120 ms) |
| Radar mode: | (Tx: R2, 120-144 ms) |
| Radar mode: | (Tx: R3, 144-168 ms) |
| Idle | (168-192 ms) |

As shown, in the 0-24 ms all the UWB anchors 104 and the mobile device 114 are in a ranging mode. In the next 24 to 72 ms, R1 and R4 are in a radar mode. The timing scheduling will may be handled by time scheduler 208 based on the position of the mobile device 114. In the radar mode, based on the number of users and authenticated devices inside the vehicle 102, the MAC scheduler 210 may select the ranging slots for radar operation. Aspects of the scheduling are discussed above with respect to FIGS. 6A-6E.

At operation 812, the controller 106 activates the outside scheduler mode of operation. Here, the outside scheduler is activated to manage the UWB anchors 104 for detection outside the vehicle 102, using a similar 192-millisecond broadcast pattern for ranging and radar functions. The pattern below may be used as an example to support Ranging and Radar Time synchronous scheduling functionality:

| Block 1: | |
|---|---|
| Ranging mode: | (Tx/Rx: phone + all anchors, 0-24 ms) |
| Radar mode: | (Tx: R1, R2 24-48 ms) |
| Radar mode: | (Tx: R3, R4 48-72 ms) |
| Idle | (72-96 ms) |
| Block 2: | |
| Ranging mode: | (Tx/Rx: phone + all anchors, 96-120 ms) |
| Radar mode: | (Tx: R1, R4 120-144 ms) |
| Radar mode: | (Tx: R2, R3 144-168 ms) |
| Idle | (168-192 ms) |

As shown, in the 0-24 ms all the UWB anchors 104 and the mobile device 114 are in a ranging mode. In the next 24 to 58 ms, R1 and R2 are in a radar mode. At 48 to 72 ms, R3 and R4 are in radar mode. As noted above, the timing scheduling will may be handled by time scheduler 208 based on the position of the mobile device 114. In the radar mode, based on the number of users and authenticated devices inside the vehicle 102, the MAC scheduler 210 may select the ranging slots for radar operation.

At operation 814, the controller 106 collects CIR messages, which provide information about signal strength and timing that is useful for detecting objects around the vehicle 102.

At operation 816, the controller 106 calculates the size and distance of detected objects. The controller 106 processes the CIR messages, using the micro-Doppler effect to determine the object's size and distance based on the frequency shifts in the radar echo signals.

At operation 818, the controller 106 checks if the size and distance of the detected object are within predefined thresholds. If not, the process returns to operation 808 to continue monitoring and collecting data. If the size and distance are within thresholds, control proceeds to operation 820 to confirm that there is a mobile device 114 inside the vehicle 102. If presence of the mobile device 114 is confirmed, control passes to operation 822 to alert the driver of the detected object, ensuring they are aware of potential hazards.

If no mobile device 114 is detected in operation 820, control proceeds to operation 824 to alerts the user via their mobile device 114. To do so, the controller 106 may send a notifications through Bluetooth if the user is within, e.g., 20 meters or through cellular networks if they are farther away. This step may also activate live video streaming to monitor the area around the vehicle 102.

Thus, the process 800 ensures continuous monitoring and appropriate alerts based on the presence of the user and the detected object's characteristics.

Thus, by using UWB CIR messages, the controller 106 detects moving objects around the vehicle 102 and alerts the driver or user when they are getting out of the vehicle 102 after some time, particularly when the vehicle 102 is in sleeping mode with cameras and radars off. The controller 106 turns on the external UWB radar while the user is still in the vehicle 102 to alert them of potential danger when opening the door. The disclosed approach provides schedulers 206 to support UWB anchor 104 devices in dual mode: Ranging mode and Radar mode, to detect the user's position and moving objects outside the vehicle 102. The approach offers time scheduler 208 and MAC scheduler 210 functionality to support ranging and radar functionality within the same ranging round, scheduling certain UWB anchors 104 more frequently if the vehicle 102 requires higher fidelity or anticipates issues from a specific direction.

Figure 9:
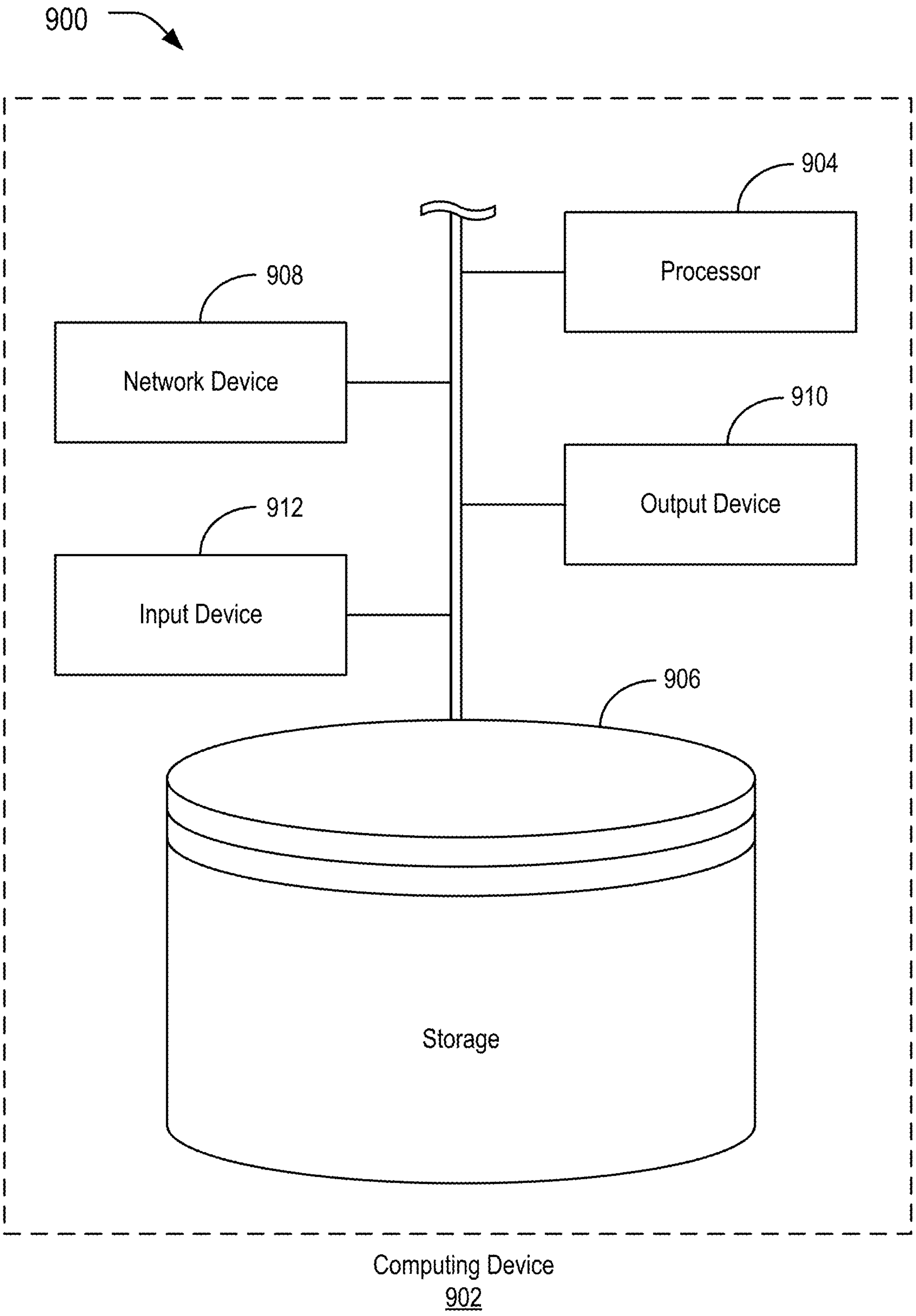
FIG. 9 illustrates an example computing device for implementing aspects of UWB radar and ranging.

FIG. 9 illustrates an example computing device 902 for implementing aspects of UWB radar and ranging. Referring to FIG. 9, and with reference to FIGS. 1-8, the vehicle 102, UWB anchors 104, controller 106, TCU 108, communications network 110, HMI 112, and mobile device 114 may include examples of such computing devices 902. Computing devices 902 generally include computer-executable instructions, where the instructions may be executable by one or more computing devices 902. Computer-executable instructions may be compiled or interpreted from computer programs created using a variety of programming languages and/or technologies, including, without limitation, and either alone or in combination, Java™, C, C++, C#, Visual Basic, Python, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

As shown, the computing device 902 may include a processor 904 that is operatively connected to a storage 906, a network device 908, an output device 910, and an input device 912. It should be noted that this is merely an example, and computing devices 902 with more, fewer, or different components may be used.

The processor 904 may include one or more integrated circuits that implement the functionality of a central processing unit (CPU) and/or graphics processing unit (GPU). In some examples, the processors 904 are a system on a chip (SoC) that integrates the functionality of the CPU and GPU. The SoC may optionally include other components such as, for example, the storage 906 and the network device 908 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 904 executes stored program instructions that are retrieved from the storage 906. The stored program instructions, accordingly, include software that controls the operation of the processors 904 to perform the operations described herein. The storage 906 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 910. The output device 910 may include a graphical or visual display device, such as an electronic display screen, projector, printer, or any other suitable device that reproduces a graphical display. As another example, the output device 910 may include an audio device, such as a loudspeaker or headphone. As yet a further example, the output device 910 may include a tactile device, such as a mechanically raiseable device that may, in an example, be configured to display braille or another physical output that may be touched to provide information to a user.

The input device 912 may include any of various devices that enable the computing device 902 to receive control input from users. Examples of suitable input devices 912 that receive human interface inputs may include keyboards, mice, trackballs, touchscreens, microphones, graphics tablets, and the like.

The network devices 908 may each include any of various devices that enable the described components to send and/or receive data from external devices over networks. Examples of suitable network devices 908 include an Ethernet interface, a Wi-Fi transceiver, a cellular transceiver, or a BLUETOOTH or BLE transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as “a,” “the,” “said,” etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method implemented by a controller of a vehicle for performing ultra-wideband (UWB) radar and ranging sessions, the method comprising:

responsive to one or more mobile devices being detected within a vehicle, activating an inside schedule mode with an inside scheduling of UWB radar sessions and UWB ranging sessions for UWB anchors of the vehicle; and responsive to the vehicle entering a key-off state, and no mobile devices being detected within the vehicle, activating an outside schedule mode with an outside scheduling of UWB radar sessions and UWB ranging sessions for the UWB anchors of the vehicle, wherein, in the inside schedule mode, the UWB anchors perform localization within the vehicle and moving object detection outside the vehicle, wherein, in the outside schedule mode, the UWB anchors perform localization of the one or more mobile devices outside the vehicle and moving object detection and/or localization inside and/or outside the vehicle.

2. The method of claim 1, further comprising scheduling the UWB radar sessions and the UWB ranging sessions by configuring specific ones of the UWB anchors to send radar packets without overlapping with other UWB anchors and without interfering with slots reserved for ranging.

3. The method of claim 1, further comprising utilizing unused time slots within ranging rounds for the radar sessions.

4. The method of claim 1, further comprising utilizing unused ranging rounds for the radar sessions.

5. The method of claim 1, further comprising utilizing a combination of unused time slots within an existing ranging round and unused ranging rounds for the radar sessions.

6. The method of claim 1, further comprising:

alternating between the UWB radar sessions and the UWB ranging sessions in a time-synchronous manner;

during the UWB ranging sessions, calculating distances from at least three of the UWB anchors to determine the position of a mobile device; and during the UWB radar sessions, using the UWB anchors to detect and track presence and movement of objects around the vehicle by analyzing returned radar signals.

7. The method of claim 1, further comprising in the UWB radar sessions:

transmitting radar messages;

receiving and monitoring channel impulse response (CIR) messages arising from the transmitted radar messages to detect a moving object in proximity to the vehicle; and calculating size and distance of detected objects based on the transmitted radar messages.

8. The method of claim 7, further comprising, in the inside schedule mode, alerting using a human machine interface (HMI) of the vehicle responsive to the detected moving object being within a predefined distance threshold to the vehicle.

9. The method of claim 7, further comprising, in the outside schedule mode, sending a notification to a mobile device of a user of the vehicle responsive to the detected moving object being within a predefined distance threshold to the vehicle.

10. The method of claim 1, further comprising, responsive to one of the UWB anchors being unable to join any of the UWB ranging sessions, establishing a connection between one of the UWB anchors that is joined to the UWB ranging sessions and the one of the UWB anchors unable to join, such that the UWB radar sessions can use the one of the UWB anchors unable to join to the UWB ranging sessions.

11. A system for performing ultra-wideband (UWB) radar and ranging sessions, the system comprising:

a plurality of UWB anchors of a vehicle; and a controller of the vehicle, configured to:

responsive to one or more mobile devices being detected within the vehicle, activate an inside schedule mode with an inside scheduling of UWB radar sessions and UWB ranging sessions for the UWB anchors of the vehicle, and responsive to the vehicle entering a key-off state, and no mobile devices being detected within the vehicle, activate an outside schedule mode with an outside scheduling of UWB radar sessions and UWB ranging sessions for the UWB anchors of the vehicle, wherein, in the inside schedule mode, the UWB anchors perform localization within the vehicle and moving object detection outside the vehicle, wherein, in the outside schedule mode, the UWB anchors perform the localization and moving object detection outside the vehicle.

12. The system of claim 11, wherein the controller is further configured to schedule the UWB radar sessions and the UWB ranging sessions by configuring specific ones of the UWB anchors to send radar packets without overlapping with other UWB anchors and without interfering with slots reserved for ranging.

13. The system of claim 11, wherein the controller is further configured to utilize unused time slots within ranging rounds for the radar sessions.

14. The system of claim 11, wherein the controller is further configured to utilize unused ranging rounds for the radar sessions.

15. The system of claim 11, wherein the controller is further configured to utilize a combination of unused time slots within an existing ranging round and unused ranging rounds for the radar sessions.

16. The system of claim 11, wherein the controller is further configured to:

alternate between the UWB radar sessions and the UWB ranging sessions in a time-synchronous manner;

during the UWB ranging sessions, calculate distances from at least three of the UWB anchors to determine the position of a mobile device; and during the UWB radar sessions, use the UWB anchors to detect and track presence and movement of objects around the vehicle by analyzing returned radar signals.

17. The system of claim 11, wherein the controller is further configured in the UWB radar sessions:

transmit radar messages;

receive and monitor channel impulse response (CIR) messages arising from the transmitted radar messages to detect a moving object in proximity to the vehicle; and calculate size and distance of detected objects based on the transmitted radar messages.

18. The system of claim 17, wherein the controller is further configured to:

in the inside schedule mode, alert using an HMI of the vehicle responsive to the detected object being within a predefined distance threshold to the vehicle; and/or in the outside schedule mode, send a notification to a mobile device of a user of the vehicle responsive to the detected object being within the predefined distance threshold to the vehicle.

19. The system of claim 11, wherein the controller is further configured to, responsive to one of the UWB anchors being unable to join any of the UWB ranging sessions, establish a connection between one of the UWB anchors that is joined to the UWB ranging sessions and the one of the UWB anchors unable to join, such that the UWB radar sessions can use the one of the UWB anchors unable to join to the UWB ranging sessions.

20. A non-transitory computer-readable medium comprising instructions that, when executed by a controller of a vehicle having a plurality of UWB anchors, causes the controller to perform operations including to:

responsive one or more mobile devices being detected within the vehicle, activate an inside schedule mode with an inside scheduling of UWB radar sessions and UWB ranging sessions for UWB anchors of the vehicle; and responsive to the vehicle entering a key-off state, and no mobile devices being detected within the vehicle, activate an outside schedule mode with an outside scheduling of UWB radar sessions and UWB ranging sessions for the UWB anchors of the vehicle, wherein, in the inside schedule mode, the UWB anchors perform localization within the vehicle and moving object detection outside the vehicle, wherein, in the outside schedule mode, the UWB anchors perform localization of the one or more mobile devices outside the vehicle and moving object detection and/or localization inside and/or outside the vehicle.

* * * * *